US005741552A

United States Patent [19]
Takayama et al.

[11] Patent Number: 5,741,552
[45] Date of Patent: Apr. 21, 1998

[54] COATING COMPOSITION AND METHOD FOR FORMING MULTI-LAYER COATING

[75] Inventors: Hideki Takayama; Eiichi Nishimura, both of Suita, Japan

[73] Assignee: Nippon Paint Co., Ltd., Osaka, Japan

[21] Appl. No.: 666,738

[22] Filed: Jun. 20, 1996

[30] Foreign Application Priority Data

Jun. 27, 1995 [JP] Japan ................................. 7-183487
Jun. 27, 1995 [JP] Japan ................................. 7-183488

[51] Int. Cl.$^6$ ................. B05D 7/16; B05D 1/36; B05D 3/02
[52] U.S. Cl. ................. 427/407.1; 427/386; 427/410
[58] Field of Search ................. 427/407.1, 409, 427/410, 386

[56] References Cited

U.S. PATENT DOCUMENTS

| | | | |
|---|---|---|---|
| 4,477,641 | 10/1984 | Matsumoto | 528/15 |
| 4,518,726 | 5/1985 | Kato et al. | 427/199 |
| 4,603,064 | 7/1986 | Kania | 427/407.1 |
| 4,684,697 | 8/1987 | Chang et al. | 525/100 |
| 5,017,221 | 5/1991 | Legrow et al. | 106/10 |
| 5,208,097 | 5/1993 | Homma et al. | 428/266 |
| 5,319,044 | 6/1994 | Jung et al. | 427/407.1 |
| 5,321,082 | 6/1994 | Ohsugi et al. | 525/101 |
| 5,322,714 | 6/1994 | Kato et al. | 427/407.1 |
| 5,366,768 | 11/1994 | Kasan et al. | 427/410 |
| 5,389,404 | 2/1995 | Armstrong | 427/391 |
| 5,416,147 | 5/1995 | Takarada et al. | 524/399 |
| 5,424,383 | 6/1995 | Kimura et al. | 528/12 |

FOREIGN PATENT DOCUMENTS

| | | |
|---|---|---|
| 0204526 | 12/1986 | European Pat. Off. . |
| 0450844 | 10/1991 | European Pat. Off. . |
| 0460698 | 12/1991 | European Pat. Off. . |
| 0630943 | 12/1994 | European Pat. Off. . |
| 0651009 | 5/1995 | European Pat. Off. . |
| 0702068 | 3/1996 | European Pat. Off. . |
| 3277645 | 12/1991 | Japan . |
| 423829 | 1/1992 | Japan . |
| 4169589 | 6/1992 | Japan . |
| 5287206 | 11/1993 | Japan . |
| 7011141 | 1/1995 | Japan . |
| 2270522 | 3/1994 | United Kingdom . |
| WO9210543 | 4/1994 | WIPO . |
| WO9210544 | 4/1994 | WIPO . |

*Primary Examiner*—Diana Dudash
*Attorney, Agent, or Firm*—Sughrue, Mion, Zinn, Macpeak & Seas, PLLC

[57] ABSTRACT

A multi-layer coating comprising a base coat and a topcoat is formed on an article such as a chemically-treated steel plate by coating the article with a base coat composition containing (a) a cross-linking agent which does not interfere with the hydrosilylation reaction of a topcoat composition, and (b) a functional resin reactable with the cross-linking agent, and then with a topcoat composition containing (c) (i) a blend of a hydrosilyl group-containing compound and an alkenyl group-containing compound, and/or (ii) a self-crosslinkable resin, and (d) a catalytic amount of a hydrosilylation catalyst, followed by separate or simultaneous baking. The topcoat composition may contain functional groups (phosphoric groups and/or alkoxysilyl groups) or a functional group-containing compound.

20 Claims, No Drawings

COATING COMPOSITION AND METHOD FOR FORMING MULTI-LAYER COATING

BACKGROUND OF THE INVENTION

The present invention relates to a coating composition and a method for forming a multi-layer coating suitable for automobile bodies, particularly to a coating composition with excellent curability, which is capable of providing easily recoatable topcoat with excellent hardness, film appearance, acid resistance, mar resistance, etc. as well as a good adhesion to an underlying coating layer, and a method for forming a multi-layer coating using such a coating composition.

In the finish coatings of automobiles, particularly passenger cars, clear topcoats are applied to base coats containing pigments. The topcoats mainly function to improve the appearance of coatings, and for this purpose they are required to have excellent hardness, film appearance, weather resistance, mar resistance, chemical resistance, etc. so that high gloss can be retained for a long period of time. Further, topcoats are required to have excellent resistance to scuffing or marring by automatic washing brush, etc. and excellent resistance to chemicals such as acids, alkalis, etc., and also it is required that tarry contaminants and dust, etc. can easily be removed from the topcoats.

In addition, in the case of applying the same or different paints one after another, or in the case of recoating the topcoat in defective portions thereof with the same paint as that of the topcoat, a newly coated topcoat is likely to peel off from the underlying coating layer, requiring that a topcoat composition have a high adhesion to an underlying coating layer.

Used at present for the purpose of improving weather resistance, mar resistance, chemical resistance, etc. are solvent-type topcoat compositions containing hydrosilyl group-containing acrylic polymers and melamine resins or polyisocyanate compounds. However, when the melamine resins are used as curing agents, the resultant topcoat compositions are poor in weather resistance due to the triazine skeletons of melamines, and they are insufficient in durability, etc. to acid rain which is recently becoming a serious environmental problem. Also, when polyisocyanate compounds are used as curing agents, they cause safety problems, and the resultant topcoats suffer from discoloration and poor weather resistance, etc. Such problems also exist in overcoats formed on topcoats.

Recently, regulations have been becoming stricter to organic solvent-type paints from the viewpoint of environmental protection and resource saving. However, powder coating compositions and aqueous paints containing no organic solvents fail to achieve excellent appearance such as transparency and gloss, etc. which are required for the purpose of finish-coating automobiles.

Proposed to solve these problems are curable resin compositions whose curing mechanism is a so-called hydrosilylation reaction, the addition of hydrosilyl groups to carbon-carbon double bonds (for instance, Japanese Patent Laid-Open Nos. 3-277645, 5-287206, etc.). Since bonds newly formed by the curing reaction of these compositions are extremely chemically stable silicon-carbon bonds, the resultant coatings have high weather resistance, acid resistance, etc. Also, since hydrosilylation curing agents have low coagulation, the curable resin compositions can be used for non-solvent-type or ultra-high-solid-type coating compositions. Accordingly, by using these curable resin compositions in place of conventional organic solvent-type topcoat or overcoat compositions, it can be expected that multi-layer coatings for the finish coatings of automobile bodies, etc. are provided with further improved properties while eliminating or drastically reducing organic solvents discharged to the atmosphere.

However, there is a problem that such topcoat compositions are slightly poor in adhesion to an underlying coating layer. Further, in a case where such a topcoat composition is applied in a wet-on-wet manner onto a base coat containing a conventional melamine resin as a curing agent and baked, the resulting topcoat fails to have satisfactory acid resistance and mar resistance due to an insufficient curing reaction.

OBJECT AND SUMMARY OF THE INVENTION

Accordingly, an object of the present invention is to provide a coating composition which forms a coating suitable for automobile bodies with excellent curability, hardness, film appearance, acid resistance, mar resistance, etc. as well as a good adhesion to an underlying coating layer, which coating can easily be recoated.

Another object of the present invention is to provide a method for forming a multi-layer coating using such a coating composition.

As a result of intense research in view of the above object, the inventors have found that when an article is coated with a base coat composition and then with a topcoat composition containing hydrosilyl groups, both of the resultant coating layers being baked simultaneously or successively to form a multi-layer coating, the multilayer coating with excellent hardness, film appearance, acid resistance and mar resistance can be obtained if the base coat composition contains a crosslinking agent which does not interfere with the curing reaction of the topcoat composition. They have also found that in the case of applying a topcoat composition containing hydrosilyl groups and alkenyl groups to a surface of an article, the introduction of at least one functional group selected from the group consisting of phosphoric groups, hydroxyl groups, carboxyl groups, epoxy groups and alkoxysilyl groups into a topcoat composition makes the topcoat have excellent curability, hardness, film appearance, acid resistance, mar resistance, recoatability, etc. as well as a good adhesion to an underlying coating layer. The present invention is based on these findings.

Thus, the first coating composition according to the present invention comprises (a) (i) a blend of at least one compound having a plurality of hydrosilyl groups and at least one compound having a plurality of alkenyl groups, and/or (ii) at least one compound having a plurality of hydrosilyl groups and a plurality of alkenyl groups, at least part of the compound in (a) containing phosphoric groups and/or alkoxysilyl groups in an amount of 0.001–5 mol/kg on a solid basis per the compound in (a); and (b) a catalytic amount of a hydrosilylation catalyst.

The second composition according to the present invention comprises (a) (i) a blend of at least one compound having a plurality of hydrosilyl groups and at least one compound having a plurality of alkenyl groups, and/or (ii) at least one compound having a plurality of hydrosilyl groups and a plurality of alkenyl groups; (b) a catalytic amount of a hydrosilylation catalyst; and (c) at least one selected from the group consisting of phosphoric acid, phosphates, carboxyl group-containing dipolar ion-type compounds, and compounds having at least one functional group selected from the group consisting of a hydroxyl group, a carboxyl group, an epoxy group, an alkoxysilyl group and an amino group.

The method for forming a multi-layer coating according to the present invention comprises the steps of applying a base coat composition to an article to be coated, applying a topcoat to the resultant base coat, and separately or simultaneously baking the resultant coats, wherein the topcoat composition contains (a) (i) a blend of at least one compound having a plurality of hydrosilyl groups and at least one compound having a plurality of alkenyl groups, and/or (ii) at least one compound having a plurality of hydrosilyl groups and a plurality of alkenyl groups; and (b) a catalytic amount of a hydrosilylation catalyst; and the base coat composition contains (d) a cross-linking agent which does not interfere with the hydrosilylation reaction of the topcoat composition, and (e) a functional resin reactable with the cross-linking agent.

In the first preferred embodiment of the present invention, the multi-layer coating comprises a base coat and a topcoat, the topcoat being formed from a coating composition containing (a) (i) a blend of at least one compound having a plurality of hydrosilyl groups and at least one compound having a plurality of alkenyl groups, and/or (ii) at least one compound having a plurality of hydrosilyl groups and a plurality of alkenyl groups, at least part of the compound in (a) containing phosphoric groups and/or alkoxysilyl groups in an amount of 0.001-5 mol/kg on a solid basis per the compound in (a), and (b) a catalytic amount of a hydrosilylation catalyst; and the base coat being formed from a coating composition containing (d) a cross-linking agent which does not interfere with the hydrosilylation reaction of the topcoat composition, and (e) a functional resin reactable with the cross-linking agent.

In the second preferred embodiment of the present invention, the multi-layer coating comprises a base coat and a topcoat, the topcoat being formed from a coating composition containing (a) (i) a blend of at least one compound having a plurality of hydrosilyl groups and at least one compound having a plurality of alkenyl groups, and/or (ii) at least one compound having a plurality of hydrosilyl groups and a plurality of alkenyl groups, (b) a catalytic amount of a hydrosilylation catalyst, and (c) at least one selected from the group consisting of phosphoric acid, phosphates, carboxyl group-containing dipolar ion-type compounds, and compounds having at least one functional group selected from the group consisting of a hydroxyl group, a carboxyl group, an epoxy group, an alkoxysilyl group and an amino group; and the base coat being formed from a coating composition containing (d) a cross-linking agent which does not interfere with the hydrosilylation reaction of the topcoat composition, and (e) a functional resin reactable with the cross-linking agent.

DETAILED DESCRIPTION OF THE PREFERRED EMBODIMENTS

The present invention will be explained in detail below.

The coating composition of the present invention is mainly used for a topcoat and may optionally be used for an overcoat. For the simplicity of explanation, it will be explained in connection with a topcoat. Accordingly, the same explanation will be applicable to the overcoat composition, too.

[A] Topcoat composition

[1] First topcoat composition

The first topcoat composition of the present invention comprises (a) (i) a blend of at least one compound having a plurality of hydrosilyl groups (hereinafter referred to as "hydrosilyl group-containing compound") and at least one compound having a plurality of alkenyl groups (hereinafter referred to as "alkenyl group-containing compound"), and/or (ii) at least one compound having a plurality of hydrosilyl groups and a plurality of alkenyl groups (hereinafter referred to as "self-crosslinkable resin"); and (b) a catalytic amount of a hydrosilylation catalyst. At least part of the compound in (a) preferably contains phosphoric groups and/or alkoxysilyl groups in an amount of 0.001-5 mol/kg on a solid basis per the compound in (a). These functional groups may be contained in any of the hydrosilyl group-containing compound, the alkenyl group-containing compound and the self-crosslinkable resin.

The basic structure of each component will be explained first, and the explanation of the introduction of the functional groups will be made at the end of the explanation of each component. (A) Blend of hydrosilyl group-containing compound and alkenyl group-containing compound (1) Hydrosilyl group-containing compound (a) First hydrosilyl group-containing compound The first hydrosilyl group-containing compound is preferably an organo-hydrogen polysiloxane having a structural unit represented by the general formula (1):

(1)

wherein $R^1$ is an alkyl group having 1–6 carbon atoms, a phenyl group or a phenethyl group; $R^2$ is a hydrogen atom, an alkyl group having 1–6 carbon atoms, a phenyl group or a phenethyl group; and a is a number of 2–200; and having at least two hydrosilyl groups in one molecule.

The preferred examples of the organo-hydrogen polysiloxane are compounds represented by the structural formulae (2)–(4):

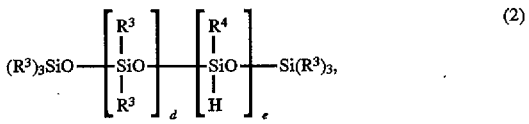

(2)

wherein $R^3$ and $R^4$ are an alkyl group having 1–6 carbon atoms, a phenethyl group or a phenethyl group; d is a number of 0–100; and e is a number of 2–200. The structural units —SiOR$^3$R$^3$— and —SiOR$^4$H— may be arranged randomly, and the end groups —SiR$^3$R$^3$R$^3$ may be bonded to the siloxane skeleton at any combination.

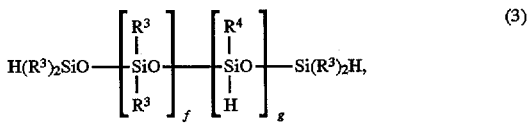

(3)

wherein $R^3$ and $R^4$ are an alkyl group having 1–6 carbon atoms, a phenethyl group or a phenethyl group; and f and g are respectively a number of 0–100. Like the above structural formula (2), the structural units —SiOR$^3$R$^3$— and —SiOR$^4$H— may be arranged randomly, and the end groups —SiR$^3$R$^3$H may be bonded to the siloxane skeleton at any combination.

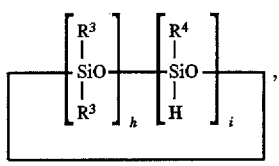  (4)

wherein $R^3$ and $R^4$ are an alkyl group having 1–6 carbon atoms, a phenyl group or a phenethyl group; h is a number of 0–8; and i is a number of 2–10, (h+i) being a number of 3–10.

The details of these organo-hydrogen polysiloxanes are disclosed by Japanese Patent Laid-Open No. 3-277645.

The alkyl groups having 1–6 carbon atoms in $R^3$ and $R^4$ in these organo-hydrogen polysiloxanes are preferably a methyl group, an ethyl group, a propyl group, a butyl group, etc. From the commercial point of view, the methyl group and the propyl group are particularly preferable. The polymerization degrees of the organo-hydrogen polysiloxanes are expressed by d–i, and the organo-hydrogen polysiloxanes having higher polymerization degrees than the above-described ranges are too viscous to handle and poor in compatibility with alkenyl components. To have an improved compatibility, the organo-hydrogen polysiloxane preferably contains a phenyl group as an organic group. Particularly preferable organo-hydrogen polysiloxanes are methyl phenyl hydrogen polysiloxane, methyl propyl hydrogen polysiloxane, etc.

(b) Second hydrosilyl group-containing compound

The second hydrosilyl group-containing compound is a homopolymer or a copolymer (not containing alkenyl groups) of a hydrogen polysiloxane macromonomer having a structural unit represented by the general formula (5):

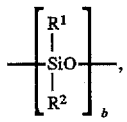  (5)

wherein $R^1$ is an alkyl group having 1–6 carbon atoms, a phenyl group or a phenethyl group; $R^2$ is a hydrogen atom, an alkyl group having 1–6 carbon atoms, a phenethyl group or a phenethyl group; and b is a number of 1–30; and having at least one hydrosilyl group in one molecule, and further having at least one (meth)acryloyloxy alkylene group in a siloxane skeleton or ends thereof.

The (meth)acryloyloxy alkylene group is preferably 3-(meth)acryloyloxy propylene group, etc. The homopolymerization or copolymerization of the hydrogen polysiloxane macromonomer can be carried out by a known solution polymerization method. The details of the homopolymers or copolymers (not containing alkenyl groups) of the hydrogen polysiloxane macromonomers are described in Japanese Patent Laid-Open Nos. 2-11141 and 4-169589. Here, it should be noted that the term "(meth)acryloyl" means acryloyl or (meth)acryloyl.

The preferred examples of the hydrogen polysiloxane macromonomers are compounds represented by the general formulae (6)–(8):

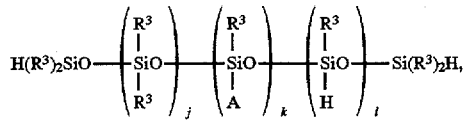  (6)

wherein $R^3$ is an alkyl group having 1–6 carbon atoms, a phenyl group or a phenethyl group; A is (meth)acryloyloxy alkylene group; j is a number of 0–20; k is a number of 1–3; and l is a number of 0–10. Each structural unit and end group may be arranged arbitrarily.

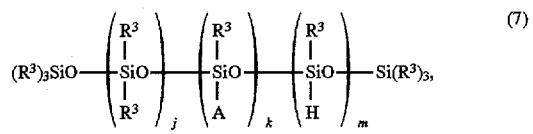  (7)

wherein $R^3$ is an alkyl group having 1–6 carbon atoms, a phenyl group or a phenethyl group; A is (meth)acryloyloxy alkylene group; j is a number of 0–20; k is a number of 1–3; and m is a number of 1–10. Each structural unit and end group may be arranged arbitrarily.

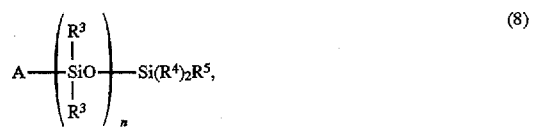  (8)

wherein $R^3$ and $R^4$ are an alkyl group having 1–6 carbon atoms, a phenethyl group, a phenethyl group or —OSi($R^3$)$_2$H; $R^5$ is a hydrogen atom or —OSi($R^3$)$_2$H; A is (meth)acryloyloxy alkylene group; and n is a number of 1–10. Each structural unit and end group may be arranged arbitrarily.

In the case of using copolymers of (meth)acryloyl group-containing hydrogen polysiloxane macromonomers, comonomers (not containing alkenyl groups) are preferably ethylenically unsaturated monomers such as acrylic monomers, vinyl monomers, etc., which are described in [A] [1] (A) (1) (d) below.

In the homopolymer or copolymer (not containing alkenyl groups) of the hydrogen polysiloxane macromonomer, it is preferable that the percentage of the hydrogen polysiloxane macromonomer is 20–100 weight %, while the percentage of the comonomers not containing alkenyl groups (preferably ethylenically unsaturated monomers) is 80–0 weight %. More preferably, the percentage of the hydrogen polysiloxane macromonomer is 40–100 weight %, while the percentage of the ethylenically unsaturated monomers not containing alkenyl groups is 60–0 weight %. When the percentage of the hydrogen polysiloxane macromonomer is less than 20 weight % (the percentage of the comonomers exceeds 80 weight %), the resultant cured coating would have a low crosslinking density, failing to exhibit sufficient mar resistance, acid resistance, etc.

The homopolymer or copolymer (not containing alkenyl groups) of the hydrogen polysiloxane macromonomer preferably has a number-average molecular weight of 1,000–30,000. Further, considering the curability of the resultant coating, the concentration of hydrosilyl groups in these polymers is preferably $1\times10^{-3}$ mol/g or more.

(c) Introduction of functional groups into hydrosilyl group-containing compound

Though the functional groups can be introduced into either or both of the first hydrosilyl group-containing compound and the second hydrosilyl group-containing compound, it is preferable from the aspect of reactivity to introduce the functional groups (phosphoric groups and/or alkoxysilyl groups) into the second hydrosilyl group-containing compound. In this case, the organo-hydrogen polysiloxane and/or the hydrogen polysiloxane macromonomer is copolymerized with monomers having the above functional groups. The preferred examples of the functional group-containing monomers are as follows:

(i) Phosphoric group-containing monomers

The phosphoric group-containing monomers may be mono[β-hydroxyethyl (meth)acrylate] acid phosphate,

[β-hydroxypropyl (meth)acrylate] acid phosphate, acid phosphoxypropyl (meth)acrylate, etc.

(ii) Alkoxysilyl group-containing monomers

The alkoxysilyl group-containing monomers may be vinyltrimethoxysilane, vinyltriethoxysilane, vinyl methyl dimethoxysilane, vinyl methyl diethoxysilane, 3-trimethoxysilylpropyl (meth)acrylate, 3-triethoxysilylpropyl (meth)acrylate, 3-dimethoxymethylsilylpropyl (meth)acrylate, etc.

The monomers listed in (i) and (ii) above include not only those having phosphoric groups or alkoxysilyl groups alone, but also those having these functional groups in combination, both being within the scope of the present invention. Of course, a plurality of monomers having the same or different functional groups may be combined.

(d) Other monomers addable to hydrosilyl group-containing compound

Besides the above functional group-containing monomers, ethylenically unsaturated monomers such as acrylic monomers, vinyl monomers, etc. may be added as comonomers.

The acrylic monomers may be (meth)acrylates such as methyl (meth)acrylate, ethyl (meth)acrylate, butyl (meth)acrylate, 2-ethylhexyl (meth)acrylate, lauryl (meth)acrylate, phenyl (meth)acrylate, benzyl (meth)acrylate, 2-hydroxyethyl (meth)acrylate, 2-hydroxypropyl (meth)acrylate, 4-hydroxybutyl (meth)acrylate, an adduct of 2-hydroxyethyl (meth)acrylate and poly-ε-caprolactone; epoxy group-containing (meth)acrylates such as glycidyl (meth)acrylate; 3-trimethoxysilylpropyl (meth)acrylate; 3-triethoxysilylpropyl (meth)acrylate; 3-dimethoxymethylsilylpropyl (meth)acrylate; (meth) acrylic-2-acrylamide-2-methylpropane. sulfonate; tributyl tin (meth)acrylate; (meth)acrylamide; (meth)acryloyl isocyanate; 2-isocyanate ethyl (meth)acrylate, etc. Here, it should be noted that the term "(meth)acrylate" means acrylate or methacrylate, both of which may be used.

The vinyl monomers may be styrene, α-methylstyrene, itaconic acid, maleic acid, vinyl acetate, allyl acetate, N-cyclohexyl maleimide, N-phenyl maleimide, etc. Further, silicone macromonomers, etc. may be used.

(2) Alkenyl group-containing compound

The alkenyl group-containing compounds usable in the present invention which may or may not contain the above functional groups (phosphoric groups and/or alkoxysilyl groups) include, for instance, (a) alkenyl group-containing polyether resins, (b) alkenyl group-containing acrylic resins, (c) alkenyl group-containing polyester resins, (d) alkenyl group-containing polycarbonate resins, (e) alkenyl group-containing epoxy resins, etc.

(a) Alkenyl group-containing polyether resins

The alkenyl group-containing polyether resins are preferably polyether resins obtained by the ring-opening polymerization of 1,2-epoxy compounds containing alkenyl groups in the presence of an active hydrogen compound such as water or a monovalent or multivalent alcohol as an initiator. Preferred examples thereof are polyether resins (number-average molecular weight: 1,200, and iodine value: 212) obtained by the ring-opening polymerization of allyl glycidyl ether in the presence of ethylene glycol as an initiator; polyether resins having chemical structures (9)–(15) and properties shown below which are obtained by the ring-opening polymerization of vinyl cyclohexane-1,2-epoxide in the presence of butanol, allyl alcohol or propargyl alcohol as an initiator (Japanese Patent Laid-No. 4-23829), etc.

(i)

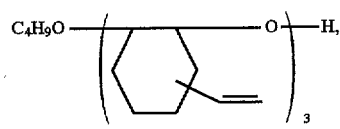
(9)

(number-average molecular weight: 450, and iodine value: 170).

(ii)

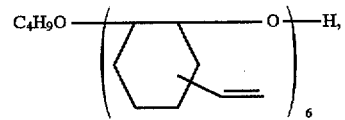
(10)

(number-average molecular weight: 820, and iodine value: 185).

(iii)

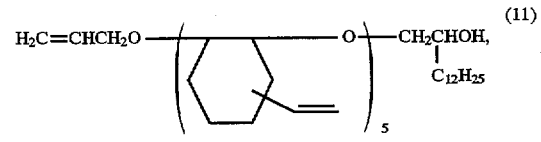
(11)

(number-average molecular weight: 890, and iodine value: 170).

(iv)

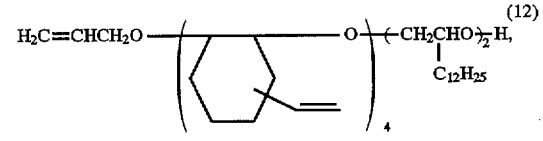
(12)

(number-average molecular weight: 980, and iodine value: 130).

(v)

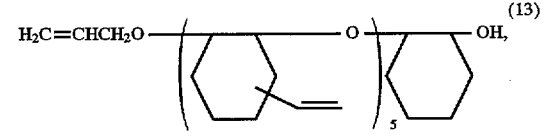
(13)

(number-average molecular weight: 780, and iodine value: 196).

(vi)

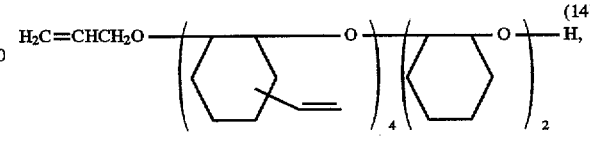
(14)

(number-average molecular weight: 750, and iodine value: 170).

(vii)

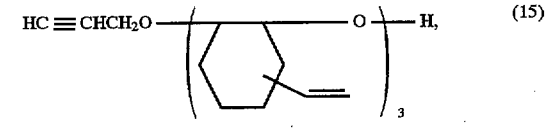
(15)

(number-average molecular weight: 430, and iodine value: 236).

The alkenyl group-containing polyether resins may also be divinyl ethers such as triethylene glycol divinyl ether, cyclohexane dimethanol divinyl ether, etc.

(b) Alkenyl group-containing acrylic resins

The alkenyl group-containing acrylic resins may be produced by the homopolymerization of alkenyl group-containing acrylic monomers or their copolymerization with other acrylic monomers. The preferred examples of the alkenyl group-containing acrylic monomers include allyl (meth)acrylate, 2-butenyl (meth)acrylate, 3-methyl-3-butenyl (meth)acrylate, 3-methyl-2-butenyl (meth)acrylate, cyclohexenylmethyl (meth)acrylate, 2-methyl-2-propenyl (meth)acrylate, 3-heptenyl (meth)acrylate, 4-hexenyl (meth)acrylate, a 1:1 adduct of 2-hydroxyethyl methacrylate and vinyl cyclohexane monoepoxide, etc. These alkenyl group-containing acrylic monomers may be synthesized, for instance, by a reaction of (meth)acrylic chloride with alkenyl alcohols, a transesterification reaction of alkyl (meth)acrylates with alkenyl alcohols, an addition reaction of an isocyanate group-containing acrylic monomers with alkenyl alcohols, etc.

Other acrylic monomers copolymerizable with the alkenyl group-containing acrylic monomers may be, for instance, methyl (meth)acrylate, ethyl (meth)acrylate, butyl (meth)acrylate, 2-ethylhexyl (meth)acrylate, lauryl (meth)acrylate, phenyl (meth)acrylate, benzyl (meth)acrylate, 2-hydroxyethyl (meth)acrylate, 2-hydroxypropyl (meth)acrylate, 4-hydroxybutyl (meth)acrylate, an adduct of 2-hydroxyethyl (meth)acrylate and poly-ε-caprolactone, glycidyl (meth)acrylate, 3-trimethoxysilylpropyl (meth)acrylate, 3-triethoxysilylpropyl (meth)acrylate, 3-dimethoxymethylsilylpropyl (meth)acrylate, (meth)acrylic-2-acrylamide-2-methylpropane sulfonate, tributyl tin (meth)acrylate, (meth)acrylamide, (meth)acryloyl isocyanate, 2-isocyanate ethyl (meth)acrylate, etc. Ethylenically unsaturated monomers other than the above acrylic monomers such as styrene, α-methylstyrene, 2,4-diphenyl-4-methyl-1-pentene, itaconic acid, maleic acid, vinyl acetate, allyl acetate, N-cyclohexyl maleimide, N-phenyl maleimide, etc. may also be used in an amount of within 50 weight % for copolymerization with the alkenyl group-containing acrylic monomers. Further, silicone macromonomers, etc. may be used.

The preferred examples of the methods for synthesizing the alkenyl group-containing acrylic resins include an addition reaction of hydroxyl group-containing acrylic resins with alkenyl isocyanates and/or alkenyl group-containing carboxylic anhydrides, an addition reaction of isocyanate group-containing acrylic resins with alkenyl alcohols, an addition reaction of carboxyl group-containing acrylic resins with alkenyl group-containing epoxy compounds, an addition reaction of epoxy group-containing acrylic resins with alkenyl group-containing carboxylic acids, etc.

The hydroxyl group-containing acrylic resins may be obtained by copolymerizing hydroxyl group-containing acrylic monomers such as 2-hydroxyethyl (meth)acrylate, 2-hydroxypropyl (meth)acrylate, 4-hydroxybutyl (meth)acrylate, an adduct of 2-hydroxyethyl (meth)acrylate and poly-ε-caprolactone, etc., other acrylic monomers than the above hydroxyl group-containing acrylic monomers, and 50 weight % or less of ethylenically unsaturated monomers, or by homopolymerizing the hydroxyl group-containing acrylic monomers.

The alkenyl isocyanates may be, for instance, allyl isocyanate, (meth)acryloyl isocyanate, 2-isocyanate ethyl (meth)acrylate, etc.

The alkenyl group-containing carboxylic anhydrides may be, for instance, itaconic anhydride, maleic anhydride, tetrahydrophthalic anhydride, etc.

The isocyanate group-containing acrylic resins may be obtained by copolymerizing isocyanate group-containing acrylic monomers such as (meth)acryloyl isocyanate, 2-isocyanate ethyl (meth)acrylate, etc., other acrylic monomers than the above isocyanate group-containing acrylic monomers, and ethylenically unsaturated monomers in an amount of within 50 weight %, or by homopolymerizing the isocyanate group-containing acrylic monomers.

The alkenyl alcohols may be allyl alcohol, vinyl alcohol, 3-butene-1-ol, 2-allyloxy ethanol, glycerin diallyl ether, cyclohexene methanol, 3-methyl-2-butene-1-ol, 3-methyl-3-butene-1-ol, 2-methyl-3-butyne-2-ol, oleyl alcohol, crotyl alcohol, hydroxybutyl vinyl ether, etc.

The carboxyl group-containing acrylic resins may be obtained by copolymerizing carboxyl group-containing acrylic monomers such as (meth)acrylic acid, etc. which may contain 50 weight % or less of carboxyl group-containing ethylenically unsaturated monomers such as itaconic acid, maleic acid, etc., and other acrylic monomers than the above carboxyl group-containing acrylic monomers which may contain 50 weight % or less of ethylenically unsaturated monomers, or by homopolymerizing the carboxyl group-containing acrylic monomers.

The alkenyl group-containing epoxy compounds may be, for instance, glycidyl (meth)acrylate, acrylic glycidyl ether, etc. The alkenyl group-containing epoxy compounds may be obtained by copolymerizing epoxy group-containing acrylic monomers such as glycidyl (meth)acrylate, etc., other acrylic monomers than the above epoxy group-containing acrylic monomers, and 50 weight % or less of ethylenically unsaturated monomers, or by homopolymerizing the epoxy group-containing acrylic monomers.

The alkenyl group-containing carboxylic acids may be allyl acetic acid, (meth)acrylic acid, 2-butenoic acid, 3-butenoic acid, crotonic acid, undecylenic acid, linoleic acid, etc.

(c) Alkenyl group-containing polyester resins

The alkenyl group-containing polyester resins may easily be produced by the polycondensation reaction of the above alkenyl alcohols, multivalent alcohols and polybasic acids. The multivalent alcohols may be ethylene glycol, propylene glycol, 1,6-hexane diol, diethylene glycol, neopentyl glycol, neopentyl glycol hydroxypivalate, trimethylolpropane, hydroxyl group-containing dimethylsiloxane with alcoholic groups at both ends, etc. The polybasic acids may be phthalic anhydride, isophthalic anhydride, terephthalic anhydride, adipic acid, azelaic acid, trimellitic acid, etc. If necessary, monovalent alcohols and monobasic acids may partially be used.

Other methods for synthesizing the alkenyl group-containing polyester resins include (i) an addition reaction of carboxyl groups in polyester resins produced by the polymerization reaction of the above multivalent alcohols and polybasic acids with the alkenyl group-containing epoxy compounds, (ii) an addition reaction of hydroxyl groups in polyester resins produced by the polymerization reaction of the above multivalent alcohols and polybasic acids with the above alkenyl isocyanates and/or alkenyl group-containing carboxylic anhydrides, etc.

(d) Alkenyl group-containing polycarbonate resins

The alkenyl group-containing polycarbonate resins may be obtained by first reacting difunctional polyols such as cyclohexane dimethanol with dimethyl carbonate, and then by reacting carbonate groups at ends of the resultant polycarbonate resins with alkenyl group-containing monoalcohols such as pentaerythritol triallyl ether, etc.

(e) Alkenyl group-containing epoxy resins

The alkenyl group-containing epoxy resins may easily be produced by (i) the addition reaction of the above epoxy group-containing acrylic resins or bisphenol A diglycidyl ether with the above alkenyl group-containing carboxylic acids, (ii) the addition reaction of hydroxyl groups of epi-bis-type epoxy resins with the above alkenyl isocyanates and/or alkenyl group-containing carboxylic anhydrides, etc.

These polyether resins, acrylic resins, polyester resins, polycarbonate resins and epoxy resins containing alkenyl groups have iodine values of preferably 50–250, more preferably 70–200. When the iodine values are lower than 50, the resultant cured coatings would have low crosslinking densities, failing to exhibit sufficient mechanical strength. On the other hand, when the iodine values exceed 250, the resultant cured coatings would show decreased flexibility. With respect to their number-average molecular weights, they are preferably 300–20,000, more preferably 400–10,000. When the number-average molecular weights are less than 300, the resultant cured coatings would have poor mechanical strength. On the other hand, when the number-average molecular weights exceed 20,000, the coating operation would become difficult.

Particularly preferable among these alkenyl group-containing compounds are the alkenyl group-containing polyether resins, the alkenyl group-containing polycarbonate resins and the alkenyl group-containing acrylic resins.

(f) Introduction of functional groups

To introduce the functional groups (phosphoric groups and/or alkoxysilyl groups) into the alkenyl group-containing compounds, the functional group-containing monomers described in [A] [1] (A) (1) (c) (i) and (ii) are added for copolymerization in the production process of the alkenyl group-containing compounds.

(3) Blending ratio of hydrosilyl group-containing compound to alkenyl group-containing compound The blending ratio of the hydrosilyl group-containing compound to the alkenyl group-containing compound is determined such that a weight ratio of hydrosilyl groups to alkenyl groups [the number of hydrogen atoms bonded to silicon atoms in the hydrosilyl group-containing compound (corresponding to the number of hydrosilyl groups) relative to one alkenyl group in the alkenyl group-containing compound] is preferably 0.3–4, more preferably 0.5–3. When the number of hydrogen atoms bonded to silicon atoms in the hydrosilyl group-containing compound is outside the above range (less than 0.3 or more than 4), it is likely that the remaining alkenyl groups and hydrogen atoms react with water or contaminants, etc., that the resultant coating is deteriorated by ultraviolet rays, and that the coating composition has poor storage stability. By controlling the blending ratio of the hydrosilyl group-containing compound to the alkenyl group-containing compound, it is possible to obtain cured coatings with excellent weather resistance, gloss and flexibility.

(B) Compounds having hydrosilyl groups and alkenyl groups

Since the compounds having a plurality of hydrosilyl groups and a plurality of alkenyl groups in one molecule are self-crosslinkable by an intramolecular hydrosilylation reaction, they may be called "self-crosslinkable resins." The self-crosslinkable resins may be produced by copolymerizing the hydrogen polysiloxane macromonomers, the alkenyl group-containing acrylic monomers and if necessary other ethylenically unsaturated monomers.

(1) Alkenyl group-containing acrylic monomers

The alkenyl group-containing acrylic monomers used herein may be those described in [A] [1] (A) (2) (b), and also usable are silicone monomers such as polydimethylsiloxypropyl (meth)acrylate with vinyl groups at ends represented by the formula (16):

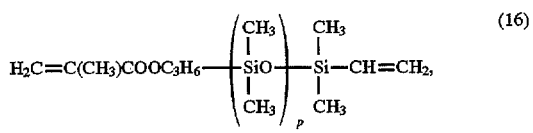

wherein p is an integer of 1–10.

(2) Other monomers

The other comonomers used if necessary may be ethylenically unsaturated monomers described in "Other monomers addable to hydrosilyl group-containing compound" in [A] [1] (A) (1) (d). Also usable are fluorinated (meth)acrylic monomers represented by the formula (17):

$$H_2C=C(R^6)COOCH_2(CF_2)_qCH_3 \qquad (17)$$

wherein $R^6$ is a hydrogen atom or a methyl group; and q is an integer of 0–10.

(3) Amount of each monomer

In the self-crosslinkable resin, the percentage of the hydrogen polysiloxane macromonomer is preferably 1–99 parts by weight, more preferably 40–60 parts by weight, the percentage of the alkenyl group-containing acrylic monomer is preferably 1–99 parts by weight, more preferably 40–60 parts by weight, and the percentage of the ethylenically unsaturated monomer is 0–80 parts by weight, more preferably 20–40 parts by weight. The self-crosslinkable resin has a number-average molecular weight of preferably 500–100,000, more preferably 1,000–20,000.

(4) Production of self-crosslinkable resin

The self-crosslinkable resin may be produced by a usual radical polymerization in a solution. When alkenyl (meth)acrylates having double bonds at ends such as allyl (meth)acrylate, 3-butenyl methacrylate, etc. are used, copolymerization can be carried out by an anion polymerization or a radical polymerization using chain transfer agents. Also, instead of using the alkenyl group-containing acrylic monomers, acrylic acid or methacrylic acid may be copolymerized with other monomers and then esterified with alkenyl group-containing alcohols such as allyl alcohol, 2-butenol, etc. Further, glycidyl methacrylate may be copolymerized with other monomers, and glycidyl groups of the resultant copolymers may be subjected to a ring-opening addition reaction with acrylic acid or methacrylic acid. Further, after copolymerization of isocyanate group-containing monomers such as 2-isocyanate ethyl methacrylate, methacryloyl isocyanate, m-isopropenyl-α,α-dimethylbenzyl isocyanate, etc. with other monomers, an addition reaction can be carried out by using the above alkenyl group-containing alcohols.

(C) Functional groups (1) Introduction of functional groups

To introduce the functional groups (phosphoric groups and/or alkoxysilyl groups) into the self-crosslinkable resins, the functional group-containing monomers described in [A] [1] (A) (1) (c) (i) and (ii) are added for copolymerization in the production process of the self-crosslinkable resins.

(2) Percentage of functional groups in first topcoat composition

The amount of the functional groups (phosphoric groups and/or alkoxysilyl groups) existing in the first topcoat composition is preferably 0.001–5 mol/kg on a solid resin basis. When the amount of the functional groups is less than 0.001 mol/kg, the resulting coating exhibits a poor adhesion to an underlying coating layer. On the other hand, even if it exceeds 5 mol/kg, further improved effects cannot be achieved. The more preferred amount of the functional groups is 0.01–3 mol/kg. Particularly when the phosphoric group is introduced, the amount of phosphoric acid or phosphates is preferably 0.05–30 weight more preferably 1–20 weight % on a solid resin basis per the topcoat composition. When the amount of phosphoric acid or phosphates is less than the above lower limit of 0.05 weight %, the resulting coating has a poor adhesion to an underlying coating layer. On the other hand, even if it exceeds the upper limit of 30 weight %, correspondingly improved effects cannot be achieved.

(D) Hydrosilylation catalyst

Usable as catalysts for the hydrosilylation reaction of carbon-carbon double bonds in a blend of the hydrosilyl group-containing compound and the alkenyl group-containing compound or in the self-crosslinkable resin are transition metals of Group VIII or their compounds, for instance, compounds of platinum, palladium, rhodium and ruthenium, etc., particularly their complexes. Specific examples of the preferred compounds are $PtCl_4$, $H_2PtCl_6\cdot 6H_2O$, Pt-vinyl siloxane complexes [for instance, $Pt_r(ViMe_2SiOSiMe_2Vi)_s$, etc.], Pt-phosphine complexes [for instance, $Pt(PPh_3)_4$, etc.], Pt-olefin complexes [for instance, $PtCl_2(cod)_2$, $Pt(acac)_2$, trans- or cis-$[PtCl_2(NH_2Pr)_2]$, etc.], $PdCl_2(PPh_3)_2$, $PdCl_2(PhCN)_2$, $PhCl_2(PPh_3)_3$, $[RhCl(cod)]_2$, $Ru(cpd)_2$, etc., wherein
- Me: methyl group,
- Vi: vinyl group,
- Ph: phenyl group,
- Pr: propyl group,
- cod: cyclooctadiene,
- acac: acetyl acetonate,
- cpd: cyclopentadiene, and
- r, s: integer.

In addition to the above, ruthenium carbonyl metal cluster complexes, cyclopentadienyl-tri-aliphatic platinum complexes described in Japanese PCT Publication No. 6-503591, diolefin-aryl platinum complexes described in Japanese PCT Publication No. 6-503592, etc. may be used. Among them, the platinum catalysts are most generally usable. These catalysts may be diluted in alcohols, aromatic or aliphatic hydrocarbons, ketones, basic solvents, etc., if necessary.

The amount of the hydrosilylation catalyst is preferably 5–10,000 ppm, particularly 20–1,000 ppm per the solid resin components in the coating composition. When the amount of the hydrosilylation catalyst is less than 5 ppm, the resulting coating exhibits poor curability. On the other hand, when it exceeds 10,000 ppm, the cured coating is likely to be colored by the catalyst, and the production cost of the cured coating becomes high because of expensive transition metals of Group VIII.

To control the reactivity of components, agents (retarders) for retarding the curing of the coating composition by coordination to the catalyst such as acetylene compounds may conveniently be added. Such retarders may be, for instance, polymers of esters of (i) ethynyl alcohol, propargyl alcohol, 2-methyl-3-butyne-2-ol, 3-trimethylsiloxypropyne, 3-trimethylsiloxy-3,3-dimethylpropyne, bis(1,1-dimethyl-2-propynyloxy)dimethyl silane, bis(1,1-dimethyl-2-propynyloxy)diphenyl silane, bis(1,1-dimethyl-2propynyloxy)phenylmethyl silane, α,α-dialkylpropargyl alcohol, etc. or ethylene oxide adducts thereof; and (ii) (meth)acrylic acid. Alkyl group-containing acrylic polymers described in Japanese Patent Laid-Open No. 5-287206 may also be used.

[2] Second topcoat composition

The second topcoat composition comprises (a) (i) a blend of at least one hydrosilyl group-containing compound and at least one alkenyl group-containing compound, and/or (ii) at least one self-crosslinkable resin; (b) a catalytic amount of a hydrosilylation catalyst; and (c) at least one selected from the group consisting of phosphoric acid, phosphates, carboxyl group-containing dipolar ion-type compounds, and compounds having at least one functional group selected from the group consisting of a hydroxyl group, a carboxyl group, an epoxy group, an alkoxysilyl group and an amino group. With respect to the compounds (a) and (b), their types and amounts may be the same as those described in [A] [1]. Thus, detailed description will be made only on the functional group-containing compound (c) hereinafter.

(A) Functional group-containing compound

In the second topcoat composition, the functional group-containing compound, which is at least one selected from the group consisting of phosphoric acid, phosphates, carboxyl group-containing dipolar ion-type compounds, and compounds having at least one functional group selected from the group consisting of a hydroxyl group, a carboxyl group, an epoxy group, an alkoxysilyl group and an amino group, is contained instead of introducing the above functional groups into the hydrosilyl group-containing compound, etc.

(1) Phosphoric acid and phosphates

The phosphates may be of high molecular weight or low molecular weight. In any case, phosphoric acid and phosphates do not contain alkenyl groups and hydrosilyl groups. The low-molecular weight phosphates are represented by the general formula (18):

(18)

wherein $R^7$ is an alkyl group having 1–18 carbon atoms; and t is 1 or 2, having a molecular weight of 100–600. Such low-molecular weight phosphates may be monoesters such as monomethyl phosphate, monoethyl phosphate, monobutyl phosphate, monooctyl phosphate, monostearyl phosphate, etc.; and diesters such as dimethyl phosphate, diethyl phosphate, dibutyl phosphate, dioctyl phosphate, distearyl phosphate, etc. These low-molecular weight phosphates may be used alone or in combination. The low-molecular weight phosphates may be produced by the reaction of phosphorus pentoxide ($P_2O_5$) with alcohols, followed by hydrolysis, if necessary.

The high-molecular weight phosphates may be (i) polymers containing phosphate groups represented by the general formula (19):

(19)

wherein $R^8$ is an alkyl group having 1–18 carbon atoms, having a molecular weight of 1,000–30,000; and (ii) adducts of epoxy compounds and phosphoric acid or acid phosphates.

With respect to the phosphate group-containing polymers (i), they may be homopolymers or copolymers of phosphate group-containing monomers such as mono[β-hydroxyethyl (meth)acrylate] acid phosphate, [β-hydroxypropyl (meth)acrylate] acid phosphate, etc. In the case of copolymers, comonomers copolymerizable with the phosphate group-containing monomers may be exemplified without intention of restriction as follows: aromatic compounds such as styrene, vinyltoluene, etc.; (meth)acrylates such as methyl (meth)acrylate, ethyl (meth)acrylate, propyl (meth)acrylate, butyl (meth)acrylate, 2-ethylhexyl (meth)acrylate, etc.; hydroxy (meth)acrylates such as β-hydroxyethyl (meth) acrylate, β-hydroxypropyl (meth)acrylate, β-hydroxybutyl (meth)acrylate, etc.; carboxylic acids such as (meth)acrylic acid, itaconic acid, fumaric acid, etc.; carboxylates such as mono(meth)acryloyloxyethyl phthalate, butyl maleate, etc.

The adducts (ii) of epoxy compounds and phosphoric acid or acid phosphates may be obtained by the addition reaction of phosphoric acid or acid phosphates such as monobutyl phosphate to the epoxy compounds. The epoxy compounds may be homopolymers or copolymers of glycidyl group-containing monomers such as propylene oxide, diglycidyl ether of bisphenol A, allyl glycidyl ether, glycidyl (meth) acrylate, etc.; or epoxy group-containing polyester resins obtained by adding excess amounts of epoxy compounds to carboxyl group-containing polyester resins, etc.

Usable in addition to the above phosphates are phosphates containing amide groups described in Japanese Patent Laid-Open No. 4-96978, which are represented by the general formulae (20) and (21):

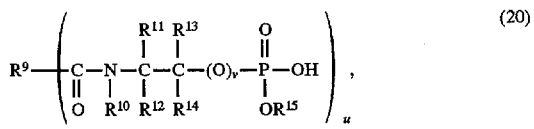

wherein $R^9$ is an alkyl group or an aryl group having a valence of u; $R^{10}$ and $R^{15}$ are a hydrogen atom, an alkyl group having 1–24 carbon atoms or an aryl group; $R^{11}$, $R^{12}$, $R^{13}$ and $R^{14}$ are a hydrogen atom, an alkyl group having 1–3 carbon atoms or an aryl group having 6–7 carbon atoms, in which $R^9$–$R^{15}$ may be the same or different; v is 0 or 1, and u is an integer of 1–4.

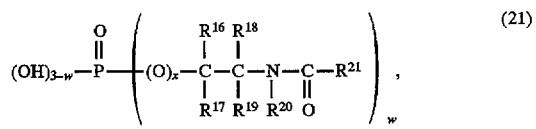

wherein $R^{16}$, $R^{17}$, $R^{18}$ and $R^{19}$ are a hydrogen atom, an alkyl group having 1–3 carbon atoms or an aryl group having 6–7 carbon atoms, and $R^{20}$ and $R^{21}$ are a hydrogen atom, an alkyl group having 1–24 carbon atoms or an aryl group, in which $R^{16}$–$R^{21}$ may be the same or different; x is 0 or 1, and w is 1 or 2.

(2) Carboxyl group-containing dipolar ion-type compounds

The dipolar ion-type compounds are exemplified by compounds represented by the general formula (22):

wherein $R^{22}$ is an alkyl group having 8–40 carbon atoms which may contain a hydroxyl group; $R^{23}$ is a hydrogen atom or an alkyl group having 1–20 carbon atoms; $R^{24}$ is an alkylene group having 1–6 carbon atoms; and A is —COO or —SO$_3$ (Japanese Patent Laid-Open No. 57-74371).

(3) Other functional group-containing compounds

The other functional group-containing compounds may be compounds containing at least one of a hydroxyl group, a carboxyl group, an epoxy group, an alkoxysilyl group and an amino group. The details of are alkoxysilyl group-containing compounds are shown in [A] [1] (A) (1) (c) (ii) above. Incidentally, the alkoxysilyl group-containing compounds may be silane coupling agents.

Thus, the other functional group-containing compounds than the alkoxysilyl group-containing compounds will be explained in (iii)–(vi) below.

(iii) Hydroxyl group-containing compounds (monomers)

The hydroxyl group-containing monomers may be hydroxyl group-containing acrylic monomers exemplified by 2-hydroxyethyl (meth)acrylate, 2-hydroxypropyl (meth) acrylate, 4-hydroxybutyl (meth)acrylate, an adduct of 2-hydroxyethyl (meth)acrylate and poly-ε-caprolactone, etc.

(iv) Carboxyl group-containing compounds (monomers)

The carboxyl group-containing monomers may be itaconic acid, maleic acid, (meth)acrylic acid, crotonic acid, phthalic acid, etc.

(v) Epoxy group-containing compounds (monomers)

The epoxy group-containing monomers may be epoxy group-containing acrylic monomers exemplified by glycidyl (meth)acrylate, 4-glycidoxybutyl (meth)acrylate, etc.

(vi) Amino group-containing compounds (monomers)

The amino group-containing monomers may be melamines, benzoguanamine, etc.

(B) Percentage of functional group-containing compounds

The amount of the above functional group-containing compound is preferably determined such that the concentration of the functional groups is 0.01–100 parts by weight per 100 parts by weight of the solid resin components in the topcoat composition. When the amount of the functional group-containing compound is so small that the concentration of the functional groups is less than 0.01 parts by weight, the resultant coating has a poor adhesion to an underlying coating layer. On the other hand, even if it exceeds 100 parts by weight, further improved effects cannot be achieved. The more preferred concentration of the functional groups is 0.1–50 parts by weight.

Particularly when phosphoric acid or a phosphate is used, the concentration of the functional group is preferably 0.05–30 parts by weight, more preferably 0.05–10 parts by weight per 100 parts by weight of the solid resin components in the topcoat composition. Also, when a phosphoric group-containing compound is used, the concentration of the phosphoric group is preferably 0.05–100 parts by weight, more preferably 0.05–50 parts by weight per 100 parts by weight of the solid resin components in the topcoat composition. When the amount of phosphoric acid or phosphate in the form of a monomer or a resin is less than the above range, the resultant coating has a poor adhesion to an underlying coating layer. On the other hand, even if it exceeds the above range, further improved effects cannot be achieved.

[3] Other components

In addition to the above components, the topcoat composition may further contain conventional additives, for instance, viscosity modifiers such as organic montmorilonite, polyamides, polyethylene wax, etc.; surface adjusters such as silicone, organic polymers, etc.; ultraviolet absorbers; antioxidants such as hindered phenols, hindered amines, etc.; light stabilizers, etc.

[4] Properties of topcoat composition

The topcoat composition preferably has a viscosity of 30–1,000 centipoise at 20° C., and the resultant cured coating preferably has a dynamic glass transition temperature Tg of 40° C. or higher. In a thermogravimetry, a residue at 500° C. is preferably 20 weight % or more. Further, the resultant cured coating preferably has a water contact angle of 80° or more.

Coatings resulting from the topcoat composition exhibit not only excellent properties required for topcoats, such as hardness, weather resistance, solvent resistance, chemical resistance, impact resistance, mar resistance, etc., but also a good adhesion to an underlying coating layer such as a base coat. They are also excellent in finish appearance such as transparency, gloss, etc. Further, since the coatings resulting from the topcoat composition exhibit as high water repellency as that of conventional water-repellent topcoat containing fluoroplastics, they are resistant to stain, which if any can easily be washed away. Also, the topcoat composition can be prepared in the form of an ultra-high solid paint having a nonvolatile content of 60 weight % or more, making it possible to drastically reduce the amounts of organic solvents discharged to the atmosphere.

Thus, the topcoat composition of the present invention can be used as an overcoat composition, too, resulting in cured coatings with excellent hardness, weather resistance, solvent resistance, chemical resistance, impact resistance, mar resistance, transparency, gloss, water repellency, etc. Accordingly, the explanation of the coating composition herein is applicable to the overcoat composition as it is.

[5] Specific examples of topcoat composition

With respect to the resin components in the topcoat composition, preferred combinations may be exemplified below. It should be noted that only the phosphoric group is referred to as a functional group for simplicity, though any other functional groups may be contained similarly.

(1) Hydrosilyl group-containing compound+alkenyl group-containing compound, at least one of which contains phosphoric groups.

(2) Self-crosslinkable resin having at least partially phosphoric groups.

(3) Hydrosilyl group-containing compound+alkenyl group-containing compound, at least one of which contains phosphoric groups+self-crosslinkable resin which may or may not contain phosphoric groups.

(4) Hydrosilyl group-containing compound which may or may not contain phosphoric groups+alkenyl group-containing compound which may or may not contain phosphoric groups+self-crosslinkable resin which contains phosphoric groups.

(5) Hydrosilyl group-containing compound which may or may not contain phosphoric groups+alkenyl group-containing compound which may or may not contain phosphoric groups+phosphoric group-containing compound.

(6) self-crosslinkable resin which may or may not contain phosphoric groups+phosphoric group-containing compound.

(7) Hydrosilyl group-containing compound which may or may not contain phosphoric groups+alkenyl group-containing compound which may or may not contain phosphoric groups+self-crosslinkable resin which may or may not contain phosphoric groups+phosphoric group-containing compound.

[B] Base coat composition

Though the topcoat composition may be applied to articles such as metals, plastics, electrodeposition layers, intermediate coating layers, etc. by conventional coating methods, the topcoat composition may be applied onto base coats formed on such articles to produce multi-layer coatings. The base coat composition preferably comprises a crosslinking agent, a functional group-containing resin, a solvent, and if necessary pigments and other additives.

[1] Crosslinking agents

The base coat composition preferably contains a crosslinking agent which does not interfere with a hydrosilylation reaction for the curing of the topcoat composition. Such crosslinking agents may be amino resins, blocked polyisocyanate compounds, curing agents for epoxy resins, etc.

(A) Amino resins

The amino resins may be polycondensates of one or more amino compounds such as melamines, urea resins, benzoguanamine, etc. with formaldehyde; alkyl ether melamine resins obtained by reacting the above polycondensates with lower alcohols such as methanol, butanol, etc. Such alkyl ether melamine resins preferably have number-average molecular weights of 400–1,200.

In the preferred amino resins, hydrogen atoms in —$NH_2$ groups bonded to the triazine ring are mostly substituted by alkyl ether groups (—$CH_2OR$). In the particularly preferred embodiment, the amino resins have 0–1 imino group on average per one triazine ring, and 0–0.2 imino group per one triazine ring is more preferable. In other words, the number of alkyl ether groups bonded to one triazine ring is preferably 5–6, more preferably 5.8–6, the maximum number of substitutable hydrogen atoms being 6.

When the average number of imino groups per one triazine ring exceeds 1, the hydrosilylation reaction of the topcoat composition is hindered, resulting in a decrease in hardness of the cured coating. Incidentally, the average number of imino groups per one triazine ring is calculated from weight ratios of carbon, hydrogen and nitrogen determined by elemental analysis and a molar ratio of —NH/—$NCH_2OR$ determined by $^1$H-NMR.

(B) Blocked polyisocyanate compounds

The blocked polyisocyanate compounds may be aliphatic polyfunctional isocyanates such as hexamethylene diisocyanate (HMDI), alicyclic polyfunctional isocyanates such as isophorone diisocyanate (IPDI), polyisocyanate compounds such as diphenylmethane-4,4'-diisocyanate (MDI) and hydrogenated MDI, etc., functional groups thereof being partially or totally blocked.

(C) Curing agents for epoxy resins

The curing agents for epoxy resins may be aliphatic polyamines such as diethylenetriamine, triethylenetetramine, ethylaminopropylamine, etc.; alicyclic polyamines; aliphatic polyamine adducts; ketimines; modified aliphatic polyamines; polyamide amines; aromatic amines; modified aromatic amines; aromatic polyamines such as diaminodiphenylmethane, etc.; modified aromatic polyamines; tertiary amine curing agents; mercaptan curing agents; acid anhydride curing agents; acid anhydride-containing copolymers such as ethylene-maleic anhydride copolymers; compounds containing phenolic OH groups such as early-stage condensates of phenol resins; dicyandiamides; trifluorosilicon composites such as trifluorosilicon-amine complexes, etc. Particularly preferable among these curing agents are diaminodiphenylmethane, dicyandiamides, trifluorosiliconamine complexes, etc.

[2] Functional resins

The functional resins used in the base coat composition are resins having at least two hydroxyl groups as functional groups for reaction with the above crosslinking agents in one molecule, exemplified by hydroxyl group-containing acrylic resins, hydroxyl group-containing polyester resins, epoxy resins, hydroxyl group-containing fluorocarbon resins, hydroxyl group-containing amide resins, etc. Preferable among them are hydroxyl group-containing acrylic resins, hydroxyl group-containing polyester resins and epoxy resins. Such functional resins can be used in the form of an aqueous type or a solvent type.

(A) Hydroxyl group-containing acrylic resins

The hydroxyl group-containing acrylic resins may be produced by polymerizing by usual methods at least one of the following monomers, at least one of which should have a hydroxyl group:

(i) Hydroxyl group-containing (meth)acrylate monomers such as hydroxymethyl (meth)acrylate, hydroxyethyl (meth)acrylate, hydroxybutyl (meth)acrylate, N-methylolacrylamide, etc.

(ii) Carboxyl group-containing ethylenically unsaturated monomers such as (meth)acrylic acid, crotonic acid, itaconic acid, maleic acid, fumaric acid, etc.

(iii) (Meth)acrylates such as methyl (meth)acrylate, ethyl (meth)acrylate, propyl (meth)acrylate, butyl (meth) acrylate, 2-ethylhexyl (meth)acrylate, n-octyl (meth) acrylate, n-dodecyl (meth)acrylate, etc.

Further, the above monomers may be combined with comonomers such as (meth)acrylonitrile, styrene, (meth) acrylamide, dimethylacrylamide, N,N-dimethylpropylacrylamide, N-butoxymethylacrylamide, diacetone acrylamide, etc.

The hydroxyl group-containing acrylic resin preferably has a number-average molecular weight of 1,800–100,000. When it is less than 1,800, the resultant cured coating has an insufficient crosslinking density, showing poor acid resistance and mar resistance. On the other hand, when it exceeds 100,000, the coating composition has excessive viscosity, failing to provide coatings with excellent appearance such as surface flatness and smoothness, etc. The more preferred number-average molecular weight of the hydroxyl group-containing acrylic resin is 5,000–20,000.

The hydroxyl group-containing acrylic resin preferably has a hydroxyl value of 20–200. When the hydroxyl value is less than 20, the coating composition is poor in curability, and the resultant coating has a poor adhesion to an underlying coating layer. On the other hand, when it exceeds 200, the remaining hydroxyl group acts to decrease the water resistance and acid resistance of the resultant coating. The more preferred hydroxyl value of the hydroxyl group-containing acrylic resin is 40–100.

The hydroxyl group-containing acrylic resin preferably has an acid value of 5–150. When the acid value is less than 5, the coating is not fully cured. On the other hand, when it exceeds 150, the coating composition has poor storage stability and increased curing speed, resulting in a poor coating appearance. The more preferred acid value of the hydroxyl group-containing acrylic resin is 5–80.

When the hydroxyl group-containing acrylic resin is to be made aqueous, it is neutralized partially or completely with a volatile base. The preferred volatile bases are ammonia or amines. Particularly preferable amines are primary, secondary or tertiary alkyl amines such as monopropylamine, monobutylamine, diethylamine, dibutylamine, triethylamine, tributylamine, monoethanolamine, ethylmonoethanolamine, dimethylaminoethanol, 2-amino-2-methyl-1-propanol, cyclohexylamine, morpholine, piperidine, etc.

(B) Hydroxyl group-containing polyester resins

The hydroxyl group-containing polyester resins may be obtained by polycondensation (esterification) of polyvalent alcohols and polybasic acids or anhydrides thereof. The polyvalent alcohols which may be used in the present invention include ethylene glycol, propylene glycol, butylene glycol, 1,6-hexanediol, diethylene glycol, dipropylene glycol, neopentyl glycol, triethylene glycol, glycerin, trimethylolethane, trimethylolpropane, pentaerithritol, dipentaerithritol, etc. The polybasic acids or their anhydrides which may be used in the present invention include phthalic acid, phthalic anhydride, isophthalic acid, tetraphthalic acid, succinic acid, succinic anhydride, adipic acid, azelaic acid, sebacic acid, tetrahydrophthalic anhydride, hexahydrophthalic anhydride, maleic anhydride, fumaric acid, itaconic acid, trimellitic anhydride, etc.

The hydroxyl group-containing polyester resin preferably has a number-average molecular weight of 200–10,000. When it is less than 200, the resultant cured coating has an insufficient crosslinking density, showing poor acid resistance and mar resistance. On the other hand, when it exceeds 10,000, the coating composition has excessive viscosity, failing to provide coatings with excellent appearance such as surface flatness and smoothness, etc. The more preferred number-average molecular weight is 300–6,000.

The hydroxyl group-containing polyester resin preferably has a hydroxyl value of 50–350. When the hydroxyl value is less than 50, the coating composition is poor in curability, and the resultant coating has a poor adhesion to an underlying coating layer. On the other hand, when it exceeds 350, the remaining hydroxyl group acts to decrease the water resistance and acid resistance of the resultant coating. The more preferred hydroxyl value is 70–280.

The hydroxyl group-containing polyester resin preferably has an acid value of 3–100. When the acid value is less than 3, the coating is not fully cured. On the other hand, when it exceeds 100, the coating composition has poor storage stability and increased curing speed, resulting in a poor coating appearance. The more preferred acid value is 5–50.

When the hydroxyl group-containing polyester resin is to be made aqueous, it is neutralized partially or completely with the above-described volatile base.

(C) Epoxy resins

The epoxy resins may be various types of bisphenol-type epoxy resins, etc., preferably having a number-average molecular weight of 300–5,000. When the number-average molecular weight of the epoxy resin is less than 300, the resultant cured coating has an insufficient crosslinking density, showing poor acid resistance and mar resistance. On the other hand, when it exceeds 5,000, it becomes difficult to provide coatings with excellent appearance such as surface flatness and smoothness, etc.

The epoxy resin preferably has an epoxy equivalent of 200–2,000. When the epoxy equivalent is lower than the above lower limit, the coating composition shows poor curability and chemical resistance. On the other hand, when it exceeds 2,000, the resultant cured coating has a decreased water resistance. The more preferred epoxy equivalent of the epoxy resin is 300–1,500.

When the epoxy resin is to be made aqueous, it is neutralized partially or completely with the above-described volatile base.

(D) Percentages of crosslinking agent and functional resin

The crosslinking agent and the functional resin are mixed such that the percentage of the crosslinking agent is 10–50 weight % (the functional resin is 90–50 weight %) on a solid resin basis. When the percentage of the crosslinking agent is less than 10 weight % (the percentage of the functional resin exceeds 90 weight %), the resultant cured coating has an insufficient crosslinking density, showing poor acid resistance and mar resistance. On the other hand, when the percentage of the crosslinking agent exceeds 50 weight % (the crosslinking agent is less than 50 weight %), the coating composition has poor storage stability and increased curing speed, resulting in a poor coating appearance. More preferably, the percentage of the crosslinking agent is 15–40 weight %, and the percentage of the functional resin is 85–60 weight %.

[3] Solvents

When the base coat composition is used in the form of a solvent-type paint, it is preferable to use organic solvents, for instance, aliphatic hydrocarbons such as Solvesso 100, Solvesso 150 (available from Exxon), etc.; aromatic hydrocarbons such as toluene, xylene, etc.; esters such as ethyl acetate, butyl acetate; ketones such as methyl ethyl ketone, methyl isobutyl ketone, acetone, isophorone, etc. alone or in combination. When the base coat composition is used in the form of an aqueous solution or dispersion-type paint, it is preferable to use, together with water, hydrophilic solvents, for instance, ethers such as carbitol acetate, butyl carbitol, etc.; alcohols such as methanol, butanol, isopropanol, ethylene glycol monomethyl ether, ethylene glycol monobutyl ether, ethylene glycol monobutyl ether acetate, etc.

[4] Pigments

The pigments which may be used in the present invention include coloring pigments such as carbon black, titanium dioxide, basic lead carbonate, graphite, zinc sulfide, zinc oxide, chromium oxide, zinc chromate, strontium chromate, barium chromate, yellow nickel titanium, yellow chromium titanium, iron oxide (yellow iron oxide, red iron oxide, black iron oxide), phthalocyanine blue, phthalocyanine green, ultramarine blue, quinacridone, indanthrone, isoindolenone, perylene, anthrapyrimidine, benzimidazolone, cadmium sulfide, diketopyrrolopyrrol, etc.; body pigments such as calcium carbonate, magnesium carbonate, barium sulfate, silicic acid, silicate, aluminum oxide hydrate, calcium sulfate, etc.; metallic or luster pigments such as finely divided metal flakes, titanium mica, cobalt sulfide, manganese sulfide, titanium sulfide, flake-shaped phthalocyanine blue, etc.

The base coat composition are classified into a metallic type or a solid type depending on the types of pigments contained therein. A weight ratio of the pigments to the solid resin components is preferably 0.01/1–1/1, more preferably 0.03/1–0.9/1.

[5] Other additives

The base coat composition may further contain if necessary acid catalysts, ultraviolet absorbers such as benzophenones, antioxidants such as phenols and sulfides, surface adjusters such as silicone, organic polymers, etc., anti-sagging agents, thickening agents, etc., in a total amount of about 0.1–5% by weight.

[C] Formation of multi-layer coating

The multi-layer coating comprising a base coat and a topcoat (or topcoat+overcoat) can be formed by known coating methods. Taking an automobile body for example, a chemical conversion-treated steel plate is subjected to electrodeposition coating and then coated with an intermediate coating composition if necessary to provide an article to be coated. After coating the article with a base coat composition and setting it, it is preferable to apply a topcoat composition to a surface of the base coat in a wet-on-wet manner. After the application of the topcoat composition, a transparent overcoat composition may be applied. The baking of a base coat and a topcoat (or+an overcoat) may be carried out simultaneously or successively. That is, processes of three coating steps/one baking step, two coating steps/one baking step, three coating steps/three baking steps, two coating steps/two baking steps, etc. may be used to form the multi-layer coating. In the case of forming a multi-layer coating by a process of two coating steps and one baking step, the article coated with the base coat composition is preferably preheated at 100° C. or lower (for instance, 80° C.) for about 10 minutes instead of setting.

In one preferred embodiment, the article such as a chemically-treated steel plate is coated with a base coat composition containing (d) a cross-linking agent which does not interfere with the hydrosilylation reaction of a topcoat composition, and (e) a functional resin reactable with the cross-linking agent, and then with a topcoat composition containing (a) (i) a blend of a hydrosilyl group-containing compound and an alkenyl group-containing compound, and/or (ii) a self-crosslinkable resin, and (b) a catalytic amount of a hydrosilylation catalyst, followed by separate or simultaneous baking.

In another preferred embodiment, the article is coated with a base coat composition containing (d) a cross-linking agent which does not interfere with the hydrosilylation reaction of a topcoat composition, and (e) a functional resin reactable with the cross-linking agent, and then with a topcoat composition containing (a) (i) a blend of a hydrosilyl group-containing compound and an alkenyl group-containing compound, and/or (ii) a self-crosslinkable resin, at least part of the compound in (a) containing phosphoric groups and/or alkoxysilyl groups in an amount of 0.001–5 mol/kg on a solid basis per the compound in (a), and (b) a catalytic amount of a hydrosilylation catalyst, followed by separate or simultaneous baking.

In a further preferred embodiment, the article is coated with a base coat composition containing (d) a cross-linking agent which does not interfere with the hydrosilylation reaction of a topcoat composition, and (e) a functional resin reactable with the cross-linking agent, and then with a topcoat composition containing (a) (i) a blend of a hydrosilyl group-containing compound and an alkenyl group-containing compound, and/or (ii) a self-crosslinkable resin, (b) a catalytic amount of a hydrosilylation catalyst, and (c) a functional group-containing compound such as phosphoric acid, phosphates, etc., followed by separate or simultaneous baking.

The coating method per se is not restrictive; air spraying, electrostatic coating, etc. are preferable. The dry thickness of the base coat is preferably 10–30 μm, the dry thickness of the topcoat is preferably 20–50 μm, and the dry thickness of the overcoat is preferably 20–50 μm. The baking temperature is preferably 120°–160° C., and the baking time is preferably 20–40 minutes.

In the case of forming a multi-layer coating by a process of two coating steps and two baking steps, the topcoat may be formed from a coating composition curable with high-energy rays such as ultraviolet rays or a coating composition curable at room temperature. In this case, it is necessary to add photosensitizers to the coating composition or to omit the addition of the retarders for suppressing the premature coordination reaction of catalysts.

The present invention will be explained in further detail by way of the following Examples without intention of restricting the scope of the present invention.

SYNTHESIS EXAMPLE 1

Synthesis of acrylic resin containing alkenyl groups (A-1)

150 parts by weight of xylene was introduced into a reactor equipped with a stirrer, a thermometer, a reflux condenser, a nitrogen gas introduction pipe and a dropping funnel, and heated to 130° C. while introducing a nitrogen gas. Thereafter, a mixture solution of the formulation shown below was dropped into the reactor through the dropping funnel at a constant speed over 3 hours.

| Composition | Parts by Weight |
| --- | --- |
| 3-Methyl-3-Butenyl Methacrylate | 50 |
| Cyclohexenylmethyl Methacrylate | 40 |
| 2,4-Diphenyl-4-Methyl-1-Pentene | 10 |
| 2,2'-Azobis(Methyl Isobutyrate) | 10 |

After the completion of dropping, the mixture was kept at 130° C. for 1 hour, and 10 parts by weight of xylene and 0.5 parts by weight of 2,2'-azobis(methyl isobutyrate) were dropped over 30 minutes. After keeping the resultant mixture at 130° C. for 2 hours, it was cooled to 50° C. Thereafter, the solvent was removed at 50° C. and 10 mmHg to obtain an alkenyl group-containing acrylic resin (A-1) (nonvolatile content: 95.2 weight %).

SYNTHESIS EXAMPLE 2
Synthesis of acrylic resin containing epoxy groups (A-2)

800 parts by weight of EPIKOTE 1009 (epoxy equivalent: 2,800, available from Shell Chemical) and 1,000 parts by weight of Butyl Cellosolve (ethylene glycol monobutyl ether) were introduced into a flask and heated at 115° C. for complete dissolution. Thereafter, a mixture of 120 parts by weight of methacrylic acid, 80 parts by weight of styrene and 47 parts by weight of benzoyl peroxide was dropped into the flask over 2 hours. After the completion of dropping, the mixture was heated at 115° C. for 2 hours while stirring, and cooled to 80° C. by adding 142 parts by weight of Butyl Cellosolve. A mixture of 100 parts by weight of dimethylaminoethanol and 324 parts by weight of deionized water were dropped into the flask over 1 hour to produce an acrylic resin containing epoxy groups (A-2).

SYNTHESIS EXAMPLE 3
Synthesis of acrylic resin containing phosphoric groups and alkenyl groups (A-3)

150 parts by weight of xylene was introduced into the same reactor as in Synthesis Example 1, and heated to 130° C. while introducing a nitrogen gas. Thereafter, a mixture solution of the formulation shown below was dropped into the reactor through the dropping funnel at a constant speed over 3 hours.

| Composition | Parts by Weight |
| --- | --- |
| 3-Methyl-3-Butenyl Methacrylate | 50 |
| Cyclohexenylmethyl Methacrylate | 35 |
| 2,4-Diphenyl-4-Methyl-1-Pentene | 10 |
| 2,2'-Azobis(Methyl Isobutyrate) | 10 |
| Acid Phosphoxypropyl Methacrylate | 5 |

After the completion of dropping, the mixture was kept at 130° C. for 1 hour, and 10 parts by weight of xylene and 0.5 parts by weight of 2,2'-azobis(methyl isobutyrate) were dropped over 30 minutes. After keeping the resultant mixture at 130° C. for 2 hours, it was cooled to 50° C. Thereafter, the solvent was removed at 50° C. and 10 mmHg to obtain an acrylic resin (A-3) containing phosphoric groups and alkenyl groups (nonvolatile content: 95.2 weight %).

SYNTHESIS EXAMPLE 4
Synthesis of acrylic resin containing phosphoric groups and hydrosilyl groups (A-4)

90 parts by weight of Solvesso 100 (available from Exxon) was introduced into the same reactor as in Synthesis Example 1, and heated to 130° C. while introducing a nitrogen gas. Thereafter, a mixture solution of the formulation shown below was dropped into the reactor through the dropping funnel at a constant speed over 3 hours.

| Composition | Parts by Weight |
| --- | --- |
| Hydrogen Polysiloxane Macromonomer A[(1)] | 98 |
| 2,2'-Azobis(Methyl Isobutyrate) | 10 |
| Acid Phosphoxypropyl Methacrylate | 2 |

Note
[(1)] represented by the formula (23):

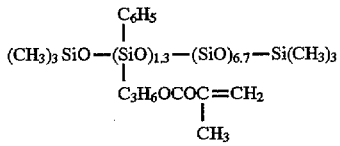

(23)

After the completion of dropping, the mixture was heated and the solvent was removed in the same manner as in Synthesis Example 3 to obtain an acrylic resin (A-4) containing phosphoric groups and hydrosilyl groups (nonvolatile content: 85.3 weight %).

SYNTHESIS EXAMPLE 5
Synthesis of acrylic resin containing phosphoric groups, alkenyl groups and hydrosilyl groups (A-5)

90 parts by weight of xylene was introduced into the same reactor as in Synthesis Example 1, and heated to 120° C. while introducing a nitrogen gas. Thereafter, a mixture solution of the formulation shown below was dropped into the reactor through the dropping funnel at a constant speed over 3 hours.

| Composition | Parts by Weight |
| --- | --- |
| Hydrogen Polysiloxane Macromonomer B[(1)] | 43 |
| 3-Methyl-3-Butenyl Methacrylate | 48 |
| 2-Ethylhexyl Methacrylate | 6 |
| 2,2'-Azobis(Methyl Isobutyrate) | 10 |
| Acid Phosphoxyethyl Methacrylate | 3 |

Note
[(1)] represented by the formula (24):

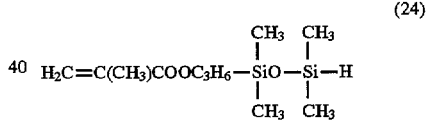

(24)

After the completion of dropping, the mixture was heated and the solvent was removed in the same manner as in Synthesis Example 3 to obtain an acrylic resin (A-5) containing phosphoric groups, alkenyl groups and hydrosilyl groups (nonvolatile content: 86.3 weight %).

SYNTHESIS EXAMPLE 6
Synthesis of acrylic resin containing hydrosilyl groups (A-6)

90 parts by weight of Solvesso 100 (available from Exxon) was introduced into the same reactor as in Synthesis Example 1, and heated to 130° C. while introducing a nitrogen gas. Thereafter, a mixture solution of 100 parts by weight of the same hydrogen polysiloxane macromonomer A as in Synthesis Example 4 and 10 parts by weight of 2,2'-azobis(methyl isobutyrate) was dropped into the reactor through the dropping funnel at a constant speed over 3 hours. After the completion of dropping, the mixture was heated and the solvent was removed in the same manner as in Synthesis Example 3 to obtain an acrylic resin (A-6) containing hydrosilyl groups (nonvolatile content: 85.3 weight %).

SYNTHESIS EXAMPLE 7
Synthesis of acrylic resin containing alkenyl groups and hydrosilyl groups (A-7)

90 parts by weight of xylene was introduced into the same reactor as in Synthesis Example 1, and heated to 120° C. while introducing a nitrogen gas. Thereafter, a mixture solution of the formulation shown below was dropped into the reactor through the dropping funnel at a constant speed over 3 hours.

| Composition | Parts by Weight |
| --- | --- |
| Hydrogen Polysiloxane Macromonomer B[(1)] | 43 |
| 3-Methyl-3-Butenyl Methacrylate | 48 |
| 2-Ethylhexyl Methacrylate | 9 |
| 2,2'-Azobis(Methyl Isobutyrate) | 10 |

Note (1) represented by the above formula (24).

After the completion of dropping, the mixture was heated and the solvent was removed in the same manner as in Synthesis Example 3 to obtain an acrylic resin (A-7) containing alkenyl groups and hydrosilyl groups (nonvolatile content: 86.3 weight %).

SYNTHESIS EXAMPLE 8

Synthesis of acrylic resin containing phosphoric groups and hydroxyl groups (A-8)

50 parts by weight of isopropanol and 50 parts by weight of ethoxypropanol were introduced into the same reactor as in Synthesis Example 1, and heated to 120° C. while introducing a nitrogen gas. Thereafter, a mixture solution of the formulation shown below was dropped into the reactor through the dropping funnel at a constant speed over 3 hours.

| Composition | Parts by Weight |
| --- | --- |
| β-Acid Phosphoxyethyl Methacrylate | 10 |
| β-Hydroxyethyl Methacrylate | 10 |
| Styrene | 10 |
| n-Butyl Methacrylate | 18 |
| n-Butyl Acrylate | 50 |
| Methacrylic Acid | 2 |
| 2,2'-Azobis(Methyl Isobutyrate) | 10 |

After the completion of dropping, the mixture was heated and the solvent was removed in the same manner as in Synthesis Example 3 to obtain an acrylic resin (A-8) containing phosphoric groups and hydroxyl groups (nonvolatile content: 50.0 weight %).

SYNTHESIS EXAMPLE 9

Synthesis of acrylic resin containing alkenyl groups and carboxyl groups (A-9)

90 parts by weight of xylene was introduced into the same reactor as in Synthesis Example 1, and heated to 130° C. while introducing a nitrogen gas. Thereafter, a mixture solution of the formulation shown below was dropped into the reactor through the dropping funnel at a constant speed over 3 hours.

| Composition | Parts by Weight |
| --- | --- |
| 3-Methyl-3-Butenyl Methacrylate | 50 |
| Cyclohexyl Methacrylate | 35 |
| Methacrylic Acid | 5 |
| 2,4-Diphenyl-4-Methyl-1-Pentene | 10 |
| 2,2'-Azobis(Methyl Isobutyrate) | 10 |

After the completion of dropping, the mixture was heated and the solvent was removed in the same manner as in Synthesis Example 3 to obtain an acrylic resin (A-9) containing alkenyl groups and carboxyl groups (nonvolatile content: 88.1 weight %).

SYNTHESIS EXAMPLE 10

Synthesis of acrylic resin containing alkenyl groups, epoxy groups and alkoxysilyl groups (A-10).

90 parts by weight of xylene was introduced into the same reactor as in Synthesis Example 1, and heated to 130° C. while introducing a nitrogen gas. Thereafter, a mixture solution of the formulation shown below was dropped into the reactor through the dropping funnel at a constant speed over 3 hours.

| Composition | Parts by Weight |
| --- | --- |
| 3-Methyl-3-Butenyl Methacrylate | 50 |
| Cyclohexyl Methacrylate | 20 |
| Glycidyl Methacrylate | 10 |
| γ-Methacryloxypropyltrimethoxysilane | 10 |
| 2,4-Diphenyl-4-Methyl-1-Pentene | 10 |
| 2,2'-Azobis(Methyl Isobutyrate) | 10 |

After the completion of dropping, the mixture was heated and the solvent was removed in the same manner as in Synthesis Example 3 to obtain an acrylic resin (A-10) containing alkenyl groups, epoxy groups and alkoxysilyl groups (nonvolatile content: 92.8 weight %).

SYNTHESIS EXAMPLE 11

Synthesis of acrylic resin containing hydroxyl groups and carboxyl groups (A-11)

90 parts by weight of xylene was introduced into the same reactor as in Synthesis Example 1, and heated to 130° C. while introducing a nitrogen gas. Thereafter, a mixture solution of the formulation shown below was dropped into the reactor through the dropping funnel at a constant speed over 3 hours.

| Composition | Parts by Weight |
| --- | --- |
| 2-Hydroxypropyl Methacrylate | 20 |
| Methacrylic Acid | 5 |
| n-Butyl Methacrylate | 50 |
| 2-Ethylhexyl Methacrylate | 15 |
| 2,4-Diphenyl-4-Methyl-1-Pentene | 10 |
| 2,2'-Azobis(Methyl Isobutyrate) | 10 |

After the completion of dropping, the mixture was heated and the solvent was removed in the same manner as in Synthesis Example 3 to obtain an acrylic resin (A-11) containing hydroxyl groups and carboxyl groups (nonvolatile content: 83.6 weight %).

SYNTHESIS EXAMPLE 12

Synthesis of acrylic resin containing hydroxyl groups, epoxy groups and alkoxysilyl groups (A-12)

90 parts by weight of xylene was introduced into the same reactor as in Synthesis Example 1, and heated to 130° C. while introducing a nitrogen gas. Thereafter, a mixture solution of the formulation shown below was dropped into the reactor through the dropping funnel at a constant speed over 3 hours.

| Composition | Parts by Weight |
|---|---|
| Glycidyl Methacrylate | 20 |
| 2-Hydroxypropyl Methacrylate | 10 |
| γ-Methacryloxypropyltrimethoxysilane | 20 |
| 2,4-Diphenyl-4-Methyl-1-Pentene | 10 |
| n-Butyl Methacrylate | 20 |
| 2-Ethylhexyl Methacrylate | 20 |
| 2,2'-Azobis(Methyl Isobutyrate) | 10 |

After the completion of dropping, the mixture was heated and the solvent was removed in the same manner as in Synthesis Example 3 to obtain an acrylic resin (A-12) containing hydroxyl groups, epoxy groups and alkoxysilyl groups (nonvolatile content: 85.2 weight Example 1

A dull steel plate having a thickness of 0.8 mm treated with a zinc phosphate chemical was subjected to electrodeposition coating using a cationic electrodeposition paint [POWERTOP U-50, available from Nippon Paint Co., Ltd.] at a dry thickness of about 25 µm, and baked at 160° C. for 30 minutes. Next, the resulting electrodeposition-coated layer was coated with an intermediate coating composition [ORGA P-2 SEALER, available from Nippon Paint Co., Ltd.] at a dry thickness of about 40 µm and baked at 140° C. for 30 minutes.

Thereafter, an aqueous, metallic base coat composition (B-1) having the formulation shown below and a viscosity adjusted to 30 seconds by FORDCUP #4 was applied by air spraying to the plate at a dry thickness of about 15 µm in a two-stage manner, and preheated at 80° C. for 10 minutes.

Formulation of Aqueous, Metallic Base Coat Composition (B-1)

| Composition | Parts by Weight (solid basis) |
|---|---|
| Aluminum Flake Paste[1] | 10 |
| Methyl Ether Melamine Resin[2] | 30 |
| Isostearyl Phosphate | 1 |
| Aqueous Acrylic Resin Varnish[3] | 56 |

Note
[1] Content of aluminum flake = 65 weight %.
[2] Nonvolatile content = 100 weight %, having —$CH_2OCH_3$ group, and imino group content = 0.1 per one triazine ring.
[3] Nonvolatile content = 50 weight %, based on an acrylamide-containing acrylic resin (number-average molecular weight: 12,000, hydroxyl value: 70, and acid value: 58) obtained by copolymerizing the monomers listed below:

| Composition | Parts by Weight |
|---|---|
| Ethylene Glycol Monobutyl Ether | 76 |
| Styrene | 15 |
| Methyl Methacrylate | 63 |
| 2-Hydroxyethyl Methacrylate | 48 |
| n-Butyl Acrylate | 117 |
| Methacrylic Acid | 27 |
| Acrylamide | 30 |
| Azobisisobutylonitrile | 3 |
| Dimethylethanol Amine | 28 |
| Deionized Water | 200 |

Next, a topcoat composition (T-1, nonvolatile content: 97.8 weight %, viscosity: 68 centipoise at 20° C., and hydrosilyl group/alkenyl group=1/1) having the formulation shown below was applied at a dry thickness of about 40 µm to the base coat in a wet-on-wet manner. Next, baking was conducted at 140° C. for 30 minutes to produce a test piece with a multi-layer coating.

Formulation of Topcoat Composition (T-1)

| Composition | Parts by Weight[1] |
|---|---|
| Alkenyl Group-Containing Compound[2] | 50 |
| Hydrosilyl Group-Containing Compound A[3] | 50 |
| $H_2PtCl_6 \cdot 6H_2O$[4] | 1 |
| Benzophenone Photostabilizer | 5 |
| Hindered Phenol Antioxidant | 2 |
| 3-Methyl-1-Butyne-1-Ol | 1 |

Note
[1] On a solid basis.
[2] Nonvolatile content = 100 weight %, represented by the formula (9):

[3] Nonvolatile content = 94 weight %, represented by the formula (25):

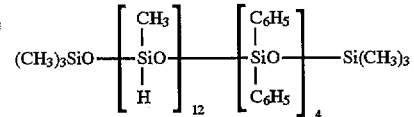

[4] 2% isopropyl alcohol (IPA) solution.

The test piece thus produced was evaluated with respect to pencil hardness, film appearance, mar resistance and acid resistance by the methods below.

(1) Pencil hardness
Measured according to JIS K5400 and evaluated according to the following criteria:
○: B or harder.
Δ: 2B.
X: 3B or softer.

(2) Film appearance
Each test piece was observed by the naked eye with respect to defects and evaluated according to the following standards:
○: No defects.
X: There was undulation (roundness) on a surface.

(3) Mar resistance
A flannel of 2 cm×2 cm was impregnated with 1 g of a 50-% aqueous dispersion of cleanser ("NEWFOAMING," available from Kao Corporation) and then fixed to a sliding head of a Gakushin-type rubbing test machine for dyeing fastness (available from Daiei Kagaku Seiki Co., Ltd.). Under a load of 500 g, the sliding head was moved back and forth 20 times on the test piece. The 20° gloss of a rubbed surface of the test piece was measured to determine a gloss retention. The evaluation of mar resistance was conducted according to the following standards.
Gloss Retention
○: 85% or more.
Δ: 70% or more and less than 85%.
X: less than 70%.

(4) Acid resistance
Each test piece was brought into contact with 0.2 ml of a 40% sulfuric acid solution at 60° C. for 15 minutes, and the surface appearance of the coating was observed by the naked eye.
⊚: No corrosion.
○: Trace corrosion.
Δ: Largely corroded.
X: Extremely corroded.

Example 2

A test piece was prepared in the same manner as in Example 1 except for using the following topcoat composition (T-2, nonvolatile content: 102.7 weight %, viscosity: 565 centipoise at 20° C., and hydrosilyl group/alkenyl group=3/2) in place of the topcoat composition (T-1), and evaluated with respect to the same properties as in Example 1.

| Formulation of Topcoat Composition (T-2) | |
|---|---|
| Composition | Parts by Weight[1] |
| Alkenyl Group-Containing Compound (A-1) | 58 |
| Hydrosilyl Group-Containing Compound A[2] | 43 |
| $H_2PtCl_6.6H_2O$ (2% IPA Solution) | 1.5 |
| Hindered Phenol Antioxidant | 1 |
| 3-Methyl-1-Butyne-1-Ol | 1 |
| Ethyl Acetate Aluminum Diisopropylate | 5 |

Note
[1] On a solid basis.
[2] Nonvolatile content = 94%, represented by the above formula (25).

Example 3

A test piece was prepared in the same manner as in Example 1 except for using the following aqueous, high-solid base coat composition (B-2) in place of the aqueous, metallic base coat composition (B-1), and evaluated with respect to the same properties as in Example 1.

| Formulation of Aqueous, High-Solid Base Coat Composition (B-2) | |
|---|---|
| Composition | Parts by Weight (solid basis) |
| Carbon Black | 4 |
| Butyl Ether Melamine Resin[1] | 30 |
| Aqueous Acrylic Resin Varnish[2] | 56 |

Note
[1] Nonvolatile content = 60 weight %.
[2] Nonvolatile content = 50 weight %, and imino group content = 0.7 per one triazine ring.

Example 4

A test piece was prepared in the same manner as in Example 3 except for using the topcoat composition (T-2, nonvolatile content: 102.7 weight %, viscosity: 565 centipoise at 20° C., and hydrosilyl group/alkenyl group=3/2) in place of the topcoat composition (T-1), and evaluated with respect to the same properties as in Example 3.

Example 5

The article to be coated was prepared in the same manner as in Example 1, and a solvent-type, metallic base coat composition (B-3) having the formulation shown below was air-sprayed to the article at a dry thickness of about 15 μm and set for about 7 minutes.

| Formulation of Solvent-Type, Metallic Base Coat Composition (B-3) | |
|---|---|
| Composition | Parts by Weight[1] |
| Aluminum Flake Paste[2] | 11 |
| Butyl Ether Melamine Resin[3] | 6 |
| Thermosetting Acrylic Resin Varnish[4] | 38 |
| Toluene | 6 |
| n-Butanol | 2 |
| Triethylamine | 1 |

| Formulation of Solvent-Type, Metallic Base Coat Composition (B-3) | |
|---|---|
| Composition | Parts by Weight[1] |

Note
[1] On a solid basis.
[2] Content of aluminum flake = 65 weight %.
[3] Nonvolatile content = 60 weight %, having —$CH_2OC_4H_9$ group, and imino group content = 0.7 per one triazine ring.
[4] Nonvolatile content = 48 weight %, ALMATEX NT-U-448 (available from Mitsui Toatsu Chemicals, Inc.).

Next, the topcoat composition (T-1, nonvolatile content: 97.8 weight %, viscosity: 68 centipoise at 20° C., and hydrosilyl group/alkenyl group=1/1) was applied to the base coat in a wet-on-wet manner and then baked at 140° C. for 30 minutes to produce a test piece with a multi-layer coating having a dry thickness of about 40 μm. The evaluations of properties were conducted in the same manner as in Example 1.

Example 6

A test piece was prepared in the same manner as in Example 5 except for using the topcoat composition (T-2, nonvolatile content: 102.7 weight %, viscosity: 565 centipoise at 20° C., and hydrosilyl group/alkenyl group=3/2) in place of the topcoat composition (T-1), and evaluated with respect to the same properties as in Example 5.

Example 7

Ingredients shown below were reacted at 130° C. to produce an acrylic resin solution A.

| Composition | Parts by Weight |
|---|---|
| 2-Hydroxyethyl Methacrylate | 150 |
| n-Butyl Acrylate | 350 |
| Methyl Methacrylate | 300 |
| Glycidyl Methacrylate | 200 |
| Azobisisobutylonitrile | 17 |
| t-Dodecyl Mercaptan | 33 |
| Ethylene Glycol Monoethyl Ether Acetate | 670 |

122 parts by weight of 2,4-tolylene diisocyanate was reacted with 312 parts by weight of diethylene glycol monoethyl ether acetate and 45 parts by weight of ethylene glycol monoethyl ether to produce a partially blocked isocyanate. The partially blocked isocyanate was then added to 724 parts by weight of the acrylic resin solution A to carry out a reaction at 70°–75° C. for 5 hours until it was confirmed by IR spectrum that isocyanate groups had disappeared. 88 parts by weight of dipropylamine was dropped to the resultant reaction solution and stirred. Added to this solution were 64 parts by weight of propionic acid, 4,747 parts by weight of deionized water, 1,432 parts by weight of ethylene glycol monoethyl ether to form a solution B of resins solubilized by an ammonium salt.

1,000 parts by weight of the resulting resin solution B, 800 parts by weight of the acrylic resin solution A, 100 parts by weight of titanium oxide, 2 parts by weight of EMULGEN 910 (available from Kao Atlas Co., Ltd.), 700 parts by weight of deionized water and 300 parts by weight of isopropanol were mixed to form an aqueous urethane-based base coat composition (B-4).

With this aqueous urethane-based base coat composition (B-4) and the topcoat composition (T-1), a test piece was prepared in the same manner as in Example 1, and evaluated with respect to the same properties as in Example 1.

Example 8

A test piece was prepared in the same manner as in Example 7 except for using the topcoat composition (T-2, nonvolatile content: 102.7 weight %, viscosity: 565 centipoise at 20° C., and hydrosilyl group/alkenyl group=3/2) in place of the topcoat composition (T-1), and evaluated with respect to the same properties as in Example 7.

Example 9

A test piece was prepared in the same manner as in Example 1 except for using the following aqueous, epoxy-based base coat composition (B-5) in place of the aqueous, metallic base coat composition (B-1), and evaluated with respect to the same properties as in Example 1.

Formulation of Aqueous, Epoxy-Based Base Coat Composition (B-5)

| Composition | Parts by Weight[1] |
|---|---|
| Epoxy Group-Containing Acrylic Resin (A-2) | 54 |
| Diaminodiphenyl Methane | 6 |
| Titanium Oxide | 12 |

Note [1]On a solid basis.

Example 10

A test piece was prepared in the same manner as in Example 9 except for using the topcoat composition (T-2, nonvolatile content: 102.7 weight %, viscosity: 565 centipoise at 20° C., and hydrosilyl group/alkenyl group=3/2) in place of the topcoat composition (T-1), and evaluated with respect to the same properties as in Example 9.

Example 11

A test piece was prepared in the same manner as in Example 1 except for using an aqueous emulsion-type, acrylic-based base coat composition (B-6, "O-DELAC," available from Nippon Paint Co., Ltd.) in place of the aqueous, metallic base coat composition (B-1), and evaluated with respect to the same properties as in Example 1.

Example 12

A test piece was prepared in the same manner as in Example 11 except for using the topcoat composition (T-2, nonvolatile content: 102.7 weight %, viscosity: 565 centipoise at 20° C., and hydrosilyl group/alkenyl group=3/2) in place of the topcoat composition (T-1), and evaluated with respect to the same properties as in Example 11.

Example 13

A dull steel plate treated in the same manner as in Example 1 was coated with the aqueous, metallic, melamine resin-based base coat composition (B-1) by air spraying at a dry thickness of about 15 μm in a two-stage manner, and preheated at 80° C. for 10 minutes.

Next, a topcoat composition (T-3) having the formulation shown below was mixed with Solvesso 100 to adjust a viscosity thereof to 26 seconds at 20° C. by FORDCUP #4, and applied to the base coat at a dry thickness of about 40 μm in a wet-on-wet manner. Baking was conducted at 140° C. for 30 minutes to produce a test piece with a multi-layer coating. The evaluations of properties were conducted in the same manner as in Example 1.

Formulation of Topcoat Composition (T-3)

| Composition | Parts by Weight[1] |
|---|---|
| Alkenyl Group-Containing Acrylic Resin (A-1) | 58 |
| Hydrosilyl Group-Containing Acrylic Resin (A-6) | 43 |
| $H_2PtCl_6 \cdot 6H_2O$ (2% IPA Solution) | 1.5 |
| Benzophenone Photostabilizer | 5 |
| Hindered Phenol Antioxidant | 2 |
| 3-Methyl-1-Butyne-1-Ol | 1 |

Note [1]On a solid basis.

Example 14

The article to be coated was prepared in the same manner as in Example 1, and a solvent-type, metallic base coat composition (B-7) having the formulation shown below was air-sprayed at a dry thickness of about 15 μm and set for about 7 minutes.

Formulation of Solvent-Type, Metallic Base Coat Composition (B-7)

| Composition | Parts by Weight[1] |
|---|---|
| Aluminum Flake Paste[2] | 11 |
| Butyl Ether Melamine Resin[3] | 14 |
| Thermosetting Acrylic Resin Varnish[4] | 67 |
| Toluene | 6 |
| n-Butanol | 2 |
| Triethylamine | 1 |

Note
[1]On a solid basis.
[2]Content of aluminum flake = 65 weight %.
[3]Nonvolatile content = 60 weight %, and imino group content = 0.7 per one triazine ring.
[4]Nonvolatile content = 48 weight %, ALMATEX NT-U-448 (available from Mitsui Toatsu Chemicals, Inc.).

Next, the topcoat composition (T-3) as in Example 13 was applied to the base coat in the same manner as in Example 1, and evaluated with respect to the same properties as in Example 1.

Comparative Example 1

A test piece was prepared in the same manner as in Example 1 except for using the following aqueous metallic base coat composition (B-8) in place of the aqueous, metallic base coat composition (B-1), and evaluated with respect to the same properties as in Example 1.

Formulation of Aqueous, Metallic Base Coat Composition (B-8)

| Composition | Parts by Weight (solid basis) |
|---|---|
| Aluminum Flake Paste[1] | 10 |
| Methyl Ether Melamine Resin[2] | 30 |
| Aqueous Acrylic Resin Varnish[3] | 56 |

Note
[1]Content of aluminum flake = 65 weight %.
[2]Nonvolatile content = 80 weight %, and imino group content = 1.7 per one triazine ring.
[3]Nonvolatile content = 50 weight %.

Comparative Example 2

A test piece was prepared in the same manner as in Comparative Example 1 except for using the topcoat composition (T-2, nonvolatile content: 102.7 weight %, viscosity: 565 centipoise at 20° C., and hydrosilyl group/alkenyl group=3/2) in place of the topcoat composition (T-1), and evaluated with respect to the same properties as in Comparative Example 1.

Comparative Example 3

A test piece was prepared in the same manner as in Example 5 except for using the following solvent-type base coat composition (B-9) in place of the solvent-type base coat composition (B-3), and evaluated with respect to the same properties as in Example 5.

| Formulation of Solvent-Type Base Coat Composition (B-9) | |
|---|---|
| Composition | Parts by Weight (solid basis) |
| Carbon Black | 2 |
| Butyl Ether Melamine Resin[1] | 21 |
| Polyester Resin[2] | 27 |
| Alkyd Resin[3] | 38 |
| Solvesso 100 | 8 |
| n-Butanol | 3 |
| Triethylamine | 0.5 |

Note
[1] Nonvolatile content = 50 weight %, and imino group content = 1.6 per one triazine ring.
[2] Acid value = 5, hydroxyl value = 80, and number-average molecular weight = 3,380.
[3] Acid value = 8, hydroxyl value = 110, number-average molecular weight = 2,700, and oil length = 20.

Comparative Example 4

A test piece was prepared in the same manner as in Comparative Example 3 except for using the topcoat composition (T-2, nonvolatile content: 102.7 weight %, viscosity: 565 centipoise at 20° C., and hydrosilyl group/alkenyl group=3/2) in place of the topcoat composition (T-1), and evaluated with respect to the same properties as in Comparative Example 3.

The evaluation results in Examples 1–14 and Comparative Examples 1–4 are shown in Table 1 below.

TABLE 1

| No. | Type of Coating | | Properties of Coating | | | |
|---|---|---|---|---|---|---|
| | Base Coat | Topcoat | Pencil Hardness | Film Appearance | Acid Resistance | Mar Resistance |
| Examples | | | | | | |
| 1 | B-1 | T-1 | ○ | ○ | ⊙ | ○ |
| 2 | B-1 | T-2 | ○ | ○ | ⊙ | ○ |
| 3 | B-2 | T-1 | ○ | ○ | ○ | ○ |
| 4 | B-2 | T-2 | ○ | ○ | ○ | ○ |
| 5 | B-3 | T-1 | ○ | ○ | ○ | ○ |
| 6 | B-3 | T-2 | ○ | ○ | ○ | ○ |
| 7 | B-4 | T-1 | ○ | ○ | ○ | ○ |
| 8 | B-4 | T-2 | ○ | ○ | ○ | ○ |
| 9 | B-5 | T-1 | ○ | ○ | ○ | ○ |
| 10 | B-5 | T-2 | ○ | ○ | ○ | ○ |
| 11 | B-6 | T-1 | ○ | ○ | ○ | ○ |
| 12 | B-6 | T-2 | ○ | ○ | ○ | ○ |
| 13 | B-1 | T-3 | ○ | ○ | ○ | ○ |
| 14 | B-7 | T-3 | ○ | ○ | ○ | ○ |
| Comparative Examples | | | | | | |
| 1 | B-8 | T-1 | X | X | X | X |
| 2 | B-8 | T-2 | X | X | X | X |
| 3 | B-9 | T-1 | X | X | X | X |
| 4 | B-9 | T-2 | X | X | X | X |

As is clear from Table 1, the multi-layer coatings of Examples 1–14 are excellent in hardness, film appearance, acid resistance and mar resistance, while those of Comparative Examples 1–4 are poor in these properties.

Example 15

A dull steel plate treated in the same manner as in Example 1 was coated with the aqueous, metallic, melamine resin-based base coat composition (B-1) by air spraying at a dry thickness of about 15 μm in a two-stage manner, and preheated at 80° C. for 10 minutes.

Next, a topcoat composition (T-4) having the formulation shown below was mixed with Solvesso 100 to adjust a viscosity thereof to 26 seconds at 20° C. by FORDCUP #4, and applied at a dry thickness of about 40 μm to the base coat in a wet-on-wet manner. Baking was conducted at 140° C. for 30 minutes to produce a test piece with a multi-layer coating.

| Formulation of Topcoat Composition (T-4) | |
|---|---|
| Composition | Parts by Weight[1] |
| Acrylic Resin (A-3) | 58 |
| Hydrosilyl Group-Containing Compound A[2] | 43 |
| $H_2PtCl_6 \cdot 6H_2O$ (2% IPA Solution) | 1.5 |
| 3-Methyl-1-Butyne-1-Ol | 1 |
| Benzophenone Photostabilizer | 5 |
| Hindered Phenol Antioxidant | 2 |
| Ethyl Acetate Aluminum Diisopropylate | 5 |

Note
[1] On a solid basis.
[2] Nonvolatile content = 94 weight %, represented by the above formula (25).

The test piece thus produced was evaluated with respect to mar resistance and acid resistance by the same methods as in Example 1. It was also evaluated with respect to adhesion to an underlying coating layer by a method below.

(5) Adhesion to an underlying coating layer

The adhesion (primary adhesion) of the topcoat to an underlying layer after being left under conditions of a temperature of 23° C. and a relative humidity of 50% for 24 hours or more was measured by a cross-cut test according to JIS D0202 4.15. Also, the adhesion (secondary adhesion) of the topcoat to an underlying layer after being immersed in warm water at 40° C. for 10 days or more was measured in the same manner.

In the cross-cut test, the topcoat of each test piece was cut straight in perpendicular directions at an interval of 1 mm to have 100 square cut pieces. An adhesive tape was stuck to the cross-cut surface of each test piece and then peeled off. The number (N) of the peeled square pieces of the topcoat was counted and classified as follows:

○: N=0,

Δ: 1≦N<50, and

X: 50≦N.

Example 16

A test piece was prepared in the same manner as in Example 15 except for using the following topcoat composition (T-5) in place of the topcoat composition (T-4), and evaluated with respect to the same properties as in Example 15.

| Formulation of Topcoat Composition (T-5) | |
|---|---|
| Composition | Parts by Weight (solid basis) |
| Acrylic Resin (A-1) | 58 |
| Acrylic Resin (A-6) | 43 |
| Acrylic Resin (A-8) | 10 |
| $H_2PtCl_6.6H_2O$ (2% IPA Solution) | 1.5 |
| Hindered Phenol Antioxidant | 2 |
| 3-Methyl-1-Butyne-1-Ol | 1 |
| Benzophenone Photostabilizer | 5 |

Example 17

The steel plate was treated in the same manner as in Example 15, and the solvent-type, metallic base coat composition (B-7) was air-sprayed at a dry thickness of about 15 μm and set for about 7 minutes.

Next, a topcoat composition (T-6) having the formulation shown below was applied at a dry thickness of about 40 μm to the base coat in a wet-on-wet manner and then baked at 140° C. for 30 minutes to produce a test piece with a multi-layer coating. The evaluations of properties were conducted in the same manner as in Example 15.

| Formulation of Topcoat Composition (T-6) | |
|---|---|
| Composition | Parts by Weight (solid basis) |
| Acrylic Resin (A-4) | 50 |
| Alkenyl Group-Containing Compound[1] | 50 |
| $H_2PtCl_6.6H_2O$ (2% IPA Solution) | 1.5 |
| Hindered Phenol Antioxidant | 2 |
| Benzophenone Photostabilizer | 5 |

Note
[1]Nonvolatile content = 100 weight %, represented by the above formula (9).

Example 18

A test piece was prepared in the same manner as in Example 17 except for using the following topcoat composition (T-7) in place of the topcoat composition (T-6), and evaluated with respect to the same properties as in Example 17.

| Formulation of Topcoat Composition (T-7) | |
|---|---|
| Composition | Parts by Weight (solid basis) |
| Acrylic Resin (A-1) | 58 |
| Acrylic Resin (A-6) | 43 |
| $H_2PtCl_6.6H_2O$ (2% IPA Solution) | 1.5 |
| Hindered Phenol Antioxidant | 2 |
| Benzophenone Photostabilizer | 5 |
| Lauryl Phosphate | 2 |

Example 19

After grinding an entire surface of an aluminum alloy plate (AC4C(V), 150 mm×70 mm×6 mm), a half of the ground surface of the aluminum alloy plate was shot-blasted with metal pieces (SUS430, 0.6-mm cut wire). The surface of the aluminum alloy plate was degreased with an alkali degreasing agent (SURFCLEANER 53, available from Nippon Paint Co., Ltd.), and subjected to a chromic chromate treatment with ALSURF 1000 (available from Nippon Paint Co., Ltd.).

Next, a topcoat composition (T-8) having the formulation shown below was air-sprayed onto the plate and baked at 140° C. for 20 minutes to produce a test piece with a topcoat having a dry thickness of about 20 μm.

| Formulation of Topcoat Composition (T-8) | |
|---|---|
| Composition | Parts by Weight (solid basis) |
| Acrylic Resin (A-5) | 95 |
| Acrylic Resin (A-8) | 5 |
| $H_2PtCl_6.6H_2O$ (2% IPA Solution) | 1.5 |
| Hindered Amine Photostabilizer | 1 |
| 3-Methyl-1-Butyne-1-Ol | 1 |

Example 20

A test piece was prepared in the same manner as in Example 19 except for using the following topcoat composition (T-9) in place of the topcoat composition (T-8), and evaluated with respect to the same properties as in Example 19.

| Formulation of Topcoat Composition (T-9) | |
|---|---|
| Composition | Parts by Weight (solid basis) |
| Acrylic Resin (A-3) | 67 |
| Acrylic Resin (A-4) | 44 |
| Acrylic Resin (A-8) | 5 |
| $H_2PtCl_6.6H_2O$ (2% IPA Solution) | 1.5 |
| Hindered Amine Photostabilizer | 1 |
| 3-Methyl-1-Butyne-1-Ol | 1 |

Example 21

The steel plate was coated with an intermediate coating composition in the same manner as in Example 15, and the following topcoat composition (T-10) was applied thereto. Next, baking was conducted at 140° C. for 30 minutes to produce a test piece with a topcoat having a dry thickness of about 40 μm.

| Formulation of Topcoat Composition (T-10) | |
|---|---|
| Composition | Parts by Weight (solid basis) |
| Acrylic Resin (A-3) | 50 |
| Acrylic Resin (A-7) | 72 |
| Acrylic Resin (A-8) | 3 |
| [RhCl(cod)]$_2$ (2% IPA Solution)[1] | 1 |
| Hindered Phenol Antioxidant | 2 |
| Benzophenone Photostabilizer | 5 |
| Titanium Oxide | 15 |

[1]Rh—olefin complex, wherein "cod" is cyclooctadiene.

Example 22

A test piece was prepared in the same manner as in Example 21 except for using the following topcoat composition (T-11) in place of the topcoat composition (T-10), and evaluated with respect to the same properties as in Example 21.

| Formulation of Topcoat Composition (T-11) | |
| --- | --- |
| Composition | Parts by Weight[1] |
| Acrylic Resin (A-1) | 58 |
| Acrylic Resin (A-6) | 43 |
| Acrylic Resin (A-8) | 2 |
| [RhCl(cod)]$_2$ (2% IPA Solution)[1] | 1 |
| Lauryl Phosphate | 2 |
| Benzophenone Photostabilizer | 5 |
| Hindered Phenol Antioxidant | 2 |
| Ethyl Acetate Aluminum Diisopropylate | 5 |
| Titanium Oxide | 15 |

Note
[1] On a solid basis.
[2] Rh—olefin complex, wherein "cod" is cyclooctadiene.

Example 23

A test piece was prepared in the same manner as in Example 15 except for using the following topcoat composition (T-12) in place of the topcoat composition (T-4), and evaluated with respect to the same properties as in Example 15.

| Formulation of Topcoat Composition (T-12) | |
| --- | --- |
| Composition | Parts by Weight (solid basis) |
| Acrylic Resin (A-1) | 58 |
| Acrylic Resin (A-6) | 43 |
| Acrylic Resin (A-11) | 5 |
| $H_2PtCl_6 \cdot 6H_2O$ (2% IPA Solution) | 1.5 |
| Benzophenone Photostabilizer | 5 |
| Hindered Phenol Antioxidant | 2 |
| 3-Methyl-1-Butyne-1-Ol | 1 |

Example 24

A test piece was prepared in the same manner as in Example 15 except for using the following topcoat composition (T-13) in place of the topcoat composition (T-4), and evaluated with respect to the same properties as in Example 15.

| Formulation of Topcoat Composition (T-13) | |
| --- | --- |
| Composition | Parts by Weight (solid basis) |
| Acrylic Resin (A-1) | 58 |
| Acrylic Resin (A-6) | 43 |
| GPTMS[1] | 5 |
| $H_2PtCl_6 \cdot 6H_2O$ (2% IPA Solution) | 1.5 |
| Benzophenone Photostabilizer | 5 |
| Hindered Phenol Antioxidant | 2 |
| 3-Methyl-1-Butyne-1-Ol | 1 |

Note
[1] γ-Glycidoxypropyltrimethoxysilane.

Example 25

A test piece was prepared in the same manner as in Example 15 except for using the following topcoat composition (T-14) in place of the topcoat composition (T-4), and evaluated with respect to the same properties as in Example 15.

| Formulation of Topcoat Composition (T-14) | |
| --- | --- |
| Composition | Parts by Weight (solid basis) |
| Acrylic Resin (A-1) | 58 |
| Acrylic Resin (A-6) | 43 |
| Acrylic Resin (A-12) | 10 |
| $H_2PtCl_6 \cdot 6H_2O$ (2% IPA Solution) | 1.5 |
| Benzophenone Photostabilizer | 5 |
| Hindered Phenol Antioxidant | 2 |
| 3-Methyl-1-Butyne-1-Ol | 1 |

Example 26

A test piece was prepared in the same manner as in Example 15 except for using the following topcoat composition (T-15) in place of the topcoat composition (T-4), and evaluated with respect to the same properties as in Example 15.

| Formulation of Topcoat Composition (T-15) | |
| --- | --- |
| Composition | Parts by Weight (solid basis) |
| Acrylic Resin (A-1) | 58 |
| Acrylic Resin (A-6) | 43 |
| Acrylic Resin (A-11) | 2.5 |
| $H_2PtCl_6 \cdot 6H_2O$ (2% IPA Solution) | 1.5 |
| N-Stearyl-β-Alanine | 1 |
| Benzophenone Photostabilizer | 5 |
| Hindered Phenol Antioxidant | 2 |
| 3-Methyl-1-Butyne-1-Ol | 1 |

Example 27

A test piece was prepared in the same manner as in Example 15 except for using the following topcoat composition (T-16) in place of the topcoat composition (T-4), and evaluated with respect to the same properties as in Example 15.

| Formulation of Topcoat Composition (T-16) | |
| --- | --- |
| Composition | Parts by Weight (solid basis) |
| Acrylic Resin (A-1) | 58 |
| Acrylic Resin (A-6) | 43 |
| AATMS[1] | 5 |
| $H_2PtCl_6 \cdot 6H_2O$ (2% IPA Solution) | 1.5 |
| Benzophenone Photostabilizer | 5 |
| Hindered Phenol Antioxidant | 2 |
| 3-Methyl-1-Butyne-1-Ol | 1 |

Note
[1] N-β-aminoethyl-γ-aminopropyltrimethoxysilane.

Example 28

A test piece was prepared in the same manner as in Example 15 except for using the following topcoat composition (T-17) in place of the topcoat composition (T-4), and evaluated with respect to the same properties as in Example 15.

Formulation of Topcoat Composition (T-17)

| Composition | Parts by Weight (solid basis) |
|---|---|
| Acrylic Resin (A-9) | 58 |
| Acrylic Resin (A-6) | 43 |
| $H_2PtCl_6 \cdot 6H_2O$ (2% IPA Solution) | 1.5 |
| N-Stearyl-$\beta$-Alanine | 1 |
| Benzophenone Photostabilizer | 5 |
| Hindered Phenol Antioxidant | 2 |
| 3-Methyl-1-Butyne-1-Ol | 1 |

Example 29

A test piece was prepared in the same manner as in Example 15 except for using the following topcoat composition (T-18) in place of the topcoat composition (T-4), and evaluated with respect to the same properties as in Example 15.

Formulation of Topcoat Composition (T-18)

| Composition | Parts by Weight (solid basis) |
|---|---|
| Acrylic Resin (A-10) | 58 |
| Acrylic Resin (A-4) | 43 |
| $H_2PtCl_6 \cdot 6H_2O$ (2% IPA Solution) | 1.5 |
| Benzophenone Photostabilizer | 5 |
| Hindered Phenol Antioxidant | 2 |
| 3-Methyl-1-Butyne-1-Ol | 1 |

Comparative Example 5

A test piece was prepared in the same manner as in Example 19 except for using the following topcoat composition (T-19) in place of the topcoat composition (T-8), and evaluated with respect to the same properties as in Example 19.

Formulation of Topcoat Composition (T-19)

| Composition | Parts by Weight (solid basis) |
|---|---|
| Acrylic Resin (A-7) | 100 |
| $H_2PtCl_6 \cdot 6H_2O$ (2% IPA Solution) | 1.5 |
| Hindered Amine Photostabilizer | 1 |

Comparative Example 6

A test piece was prepared in the same manner as in Example 21 except for using the following topcoat composition (T-20) in place of the topcoat composition (T-10), and evaluated with respect to the same properties as in Example 21.

Formulation of Topcoat Composition (T-20)

| Composition | Parts by Weight (solid basis) |
|---|---|
| Acrylic Resin (A-1) | 50 |
| Acrylic Resin (A-7) | 75 |
| $H_2PtCl_6 \cdot 6H_2O$ (2% IPA Solution) | 1.5 |
| Benzophenone Photostabilizer | 5 |
| Hindered Phenol Antioxidant | 2 |
| Titanium Oxide | 15 |
| 3-Methyl-1-Butyne-1-Ol | 1 |

The evaluation results in Examples 15–29 and Comparative Examples 5 and 6 are shown in Table 2 below.

TABLE 2

| | Type of Coating | | Properties of Coating | | | |
|---|---|---|---|---|---|---|
| No. | Base Coat | Top-coat | Mar Resistance | Acid Resistance | Primary Adhesion | Secondary Adhesion |
| Examples | | | | | | |
| 15 | B-1 | T-4 | O | ⊚ | O | O |
| 16 | B-1 | T-5 | O | ⊚ | O | O |
| 17 | B-7 | T-6 | O | ⊚ | O | O |
| 18 | B-7 | T-7 | O | ⊚ | O | O |
| 19 | Al$^{(1)}$ | T-8 | O | ⊚ | O | O |
| 20 | Al$^{(1)}$ | T-9 | O | ⊚ | O | O |
| 21 | — | T-10 | O | ⊚ | O | O |
| 22 | — | T-11 | O | ⊚ | O | O |
| 23 | B-1 | T-12 | O | ⊚ | O | O |
| 24 | B-1 | T-13 | O | ⊚ | O | O |
| 25 | B-1 | T-14 | O | ⊚ | O | O |
| 26 | B-1 | T-15 | O | ⊚ | O | O |
| 27 | B-1 | T-16 | O | ⊚ | O | O |
| 28 | B-1 | T-17 | O | ⊚ | O | O |
| 29 | B-1 | T-18 | O | ⊚ | O | O |
| Comparative Examples | | | | | | |
| 5 | Al$^{(1)}$ | T-19 | O | ⊚ | X | X |
| 6 | — | T-20 | O | ⊚ | Δ | X |

Note $^{(1)}$Aluminum alloy plate treated with chromic chromate.

As is clear from Table 2, the multi-layer coatings of Examples 15–29 are excellent in mar resistance, acid resistance and adhesion to an underlying coating layer, while those of Comparative Examples 5 and 6 are poor in adhesion to an underlying coating layer.

As described above in detail, by using a topcoat composition comprising a blend of a hydrosilyl group-containing compound and an alkenyl group-containing compound or a self-crosslinkable resin containing both hydrosilyl groups and alkenyl groups, together with a base coat composition containing a crosslinking agent which does not interfere with the hydrosilylation reaction of the topcoat composition and a functional resin capable of reacting with such a crosslinking agent, it is possible to produce a multi-layer coating excellent in hardness, film appearance, acid resistance, mar resistance, etc.

Also, by introducing at least one functional group selected from the group consisting of a hydroxyl group, a carboxyl group, an epoxy group and an alkoxysilyl group into the topcoat composition, it is possible to provide a topcoat with improved adhesion to an underlying coating layer while maintaining excellent curability, acid resistance, mar resistance, etc. Such a topcoat is also excellent in recoatability.

The multi-layer coatings obtained from the above base coat composition and the topcoat composition are suitable for automobile bodies.

What is claimed is:

1. A method of forming a multi-layer coating comprising the steps of applying a base coat composition to an article to be coated, applying a topcoat to the resultant base coat, and separately or simultaneously baking the resultant coats, wherein
   (A) said topcoat composition contains (a) a blend of at least one compound having a plurality of hydrosilyl groups and at least one compound having a plurality of alkenyl groups and (b) a catalytic amount of hydrosilylation catalyst,
   there being a sufficient amount of said at least one compound having a plurality of hydrosilyl groups which contain phosphoric groups and/or said at least one compound having a plurality of alkenyl groups which contain phosphoric groups to provide an amount of phosphoric groups in said topcoat composition of from 0.001–5 mol/kg on a solid basis based on said compounds in said blend,
   said at least one compound having a plurality of hydrosilyl groups being selected from the group consisting of (1) an organo-hydrogen polysiloxane having at least two hydrosilyl groups in one molecule represented by the following general formula:

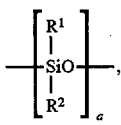

wherein $R^1$ is an alkyl group having 1–6 carbon atoms, a phenyl group or a phenethyl group, $R^2$ is a hydrogen atom, an alkyl group having 1–6 carbon atoms, a phenyl group or a phenethyl group, and a is a number of 2–200, and (2) a homopolymer or a copolymer which does not contain alkenyl groups of a hydrogen polysiloxane macromonomer having a structural unit represented by the following general formula:

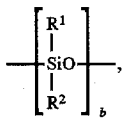

wherein $R^1$ is an alkyl group having 1–6 carbon atoms, a phenyl group or a phenethyl group, $R^2$ is a hydrogen atom, an alkyl group having 1–6 carbon atoms, a phenyl group or a phenethyl group and b is a number of 1–30, said structural unit further having at least one hydrosilyl group in one molecule and at least one (meth)acryloyloxyalkylene group in a siloxane skeleton or ends thereof, and
   said at least one compound having a plurality of alkenyl groups being selected from the group consisting of alkenyl group-containing polyether resins, alkenyl group-containing acrylic resins, alkenyl group-containing polyester resins, alkenyl group-containing polycarbonate resins and alkenyl group-containing epoxy resins; and
   (B) said base coat composition containing (d) a cross-linking agent which does not interfere with the hydrosilylation reaction of said topcoat composition and being selected from the group consisting of amino resins, blocked polyisocyanate compounds and curing agents for epoxy resins, and (e) a functional resin reactable with said cross-linking agent which is at least one resin selected from the group consisting of acrylic resins, polyester resins and epoxy resins, which functional resin is organic solvent-borne or aqueous-borne.

2. The method for forming a multi-layer coating according to claim 1, wherein said phosphoric group-containing compound is a monoester or diester of phosphoric acid.

3. The method for forming a multi-layer coating according to claim 2, wherein said monoester or diester of phosphoric acid is a phosphate group-containing polymer having a molecular weight of 1,000–30,000 or an adduct of an epoxy compound and phosphoric acid or acid phosphate.

4. The method for forming a multi-layer coating according to claim 1, wherein said phosphoric group-containing compound is at least one compound selected from the group consisting of:
   (1) a resin having at least one phosphoric group and a plurality of hydrosilyl groups in a molecule,
   (2) a resin having at least one phosphoric group and a plurality of alkenyl groups in a molecule; and
   (3) a resin having at least one phosphoric group and a plurality of hydrosilyl groups and alkenyl groups in a molecule.

5. The method for forming a multi-layer coating according to claim 1, wherein a weight ratio of said hydrosilyl groups to said alkenyl groups is 0.3–4.

6. The method for forming a multi-layer coating according to claim 1, wherein said cross-linking agent (d) is an amino resin having 0–1 imino group per one triazine ring.

7. A method for forming a multi-layer coating comprising the steps of applying a base coat composition to an article to be coated, applying a topcoat to the resultant base coat, and separately or simultaneously baking the resultant coats, wherein
   (A) said topcoat composition contains (a) a blend of at least one compound having a plurality of hydrosilyl groups and at least one compound having a plurality of alkenyl groups, (b) a catalytic amount of a hydrosilylation catalyst and (c) at least one compound selected from the group consisting of phosphoric acid and phosphates in an amount of 0.05–30 parts by weight on the basis of 100 parts by weight of solid resin components in the topcoat composition,
   said at least one compound having a plurality of hydrosilyl groups being selected from the group consisting of (1) an organo-hydrogen polysiloxane having at least two hydrosilyl groups in one molecule and represented by the following general formula:

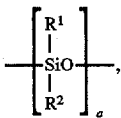

wherein $R^1$ is an alkyl group having 1–6 carbon atoms, a phenyl group or a phenethyl group, $R^2$ is a hydrogen atom, an alkyl group having 1–6 carbon atoms, a phenyl group or a phenethyl group, and a is a number of 2–200, and (2) a homopolymer or a copolymer which does not contain alkenyl groups of a hydrogen polysiloxane macromonomer having a structural unit represented by the following general formula:

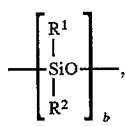

wherein $R^1$ is an alkyl group having 1–6 carbon atoms, a phenyl group or a phenethyl group, $R^2$ is a hydrogen atom, an alkyl group having 1–6 carbon atoms, a phenyl group or a phenethyl group and b is a number of 1–30, said structural unit further having at least one hydrosilyl group in the molecule and at least one (meth)acryloyloxyalkylene group in a siloxane skeleton or ends thereof, and said compound having a plurality of alkenyl groups being selected from the group consisting of alkenyl group-containing polyether resins, alkenyl group-containing acrylic resins, alkenyl group-containing polyester resins, alkenyl group-containing polycarbonate resins and alkenyl group-containing epoxy resins; and (B) said base coat composition containing (d) a cross-linking agent which does not interfere with a hydrosilylation reaction of said topcoat composition and being selected from the group consisting of amino resins,m blocked polyisocyanate compounds and curing agents for epoxy resins, and (e) a functional resin reactable with said cross-linking agent which is at least one resin selected from the group consisting of acrylic resins, polyester resins and epoxy resins, which functional resin is solvent-borne or aqueous-borne.

8. The method for forming a multi-layer coating according to claim 7, wherein said phosphate is at least one compound selected from the group consisting of:

(1) a compound represented by the following general formula:

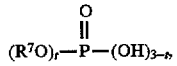

wherein $R^7$ is an alkyl group having 1–18 carbon atoms; and t is 1 or 2;

(2) a compound represented by the following general formula:

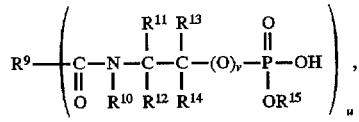

wherein $R^9$ is an alkyl group having a valence of u or an aryl group; $R^{10}$ and $R^{15}$ are a hydrogen atom, an alkyl group having 1–24 carbon atoms or an aryl group; $R^{11}$, $R^{12}$, $R^{13}$ and $R^{14}$ are a hydrogen atom, an alkyl group having 1–3 carbon atoms or an aryl group having 6–7 carbon atoms, in which said $R^9$–$R^{15}$ may be the same or different, v is 0 or 1, and u is an integer of 1–4; and (3) a compound represented by the following general formula:

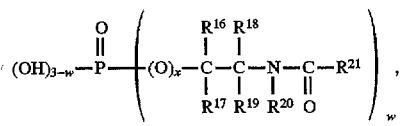

wherein $R^{16}$, $R^{17}$, $R^{18}$ and $R^{19}$ are a hydrogen atom, an alkyl group having 1–3 carbon atoms or an aryl group having 6–7 carbon atoms, and $R^{20}$ and $R^{21}$ are a hydrogen atom, an alkyl group having 1–24 carbon atoms or an aryl group, in which said $R^{16}$–$R^{21}$ may be the same or different; x is 0 or 1, and w is 1 or 2.

9. The method for forming a multi-layer coating according to claim 7, wherein a weight ratio of said hydrosilyl groups to said alkenyl groups is 0.3–4.

10. The method for forming a multi-layer coating according to claim 7, wherein said cross-linking agent (d) is an amino resin having 0–1 imino group per one triazine ring.

11. A method for forming a multi-layer coating comprising the steps of applying a base coat composition to an article to be coated, applying a topcoat to the resultant base coat, and separately or simultaneously baking the resultant coats, wherein (A) said topcoat composition contains (a) at least one compound having a plurality of hydrosilyl groups and a plurality of alkenyl groups and (b) a catalytic amount of hydrosilylation catalyst, said at least one compound being a copolymer of:

(1) a hydrogen polysiloxane macromonomer having a structural unit represented by the following general formula:

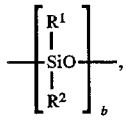

wherein $R^1$ is an alkyl group having 1–6 carbon atoms, a phenyl group or a phenethyl group, $R^2$ is a hydrogen atom, an alkyl group having 1–6 carbon atoms, a phenyl group or a phenethyl group, and b is a number of 1–30, said structural unit having at least one hydrosilyl group in one molecule, and further having at least one (meth)acryloyloxy alkylene group in a siloxane skeleton or ends thereof, and (2) an alkenyl group-containing acrylic monomer; and (B) said base coat composition containing (d) a cross-linking agent which does not interfere with a hydrosilylation reaction of said topcoat composition and being selected from the group consisting of amino resins, blocked polyisocyanate compounds and curing agents for epoxy resins, and (e) a functional resin reactable with said cross-linking agent which is at least one resin selected from the group consisting of acrylic resins, polyester resins, epoxy resins, which functional resin is solvent-borne or aqueous-borne.

12. The method for forming a multi-layer coating according to claim 11, wherein said compound (a) contains phosphoric groups and/or alkoxysilyl groups in an amount of 0.001–5 mol/kg on a solid basis based on said compound (a).

13. The method for forming a multi-layer coating according to claim 11, wherein said topcoat composition further comprises (c) at least one compound selected from the group consisting of phosphoric acid and phosphates.

14. The method for forming a multi-layer coating according to claim 12, wherein said phosphoric group-containing compound is a monoester or diester of phosphoric acid.

15. The method for forming a multi-layer coating according to claim 14, wherein said monoester or diester of phosphoric acid is a phosphate group-containing polymer having a molecular weight of 1,000–30,000 or an adduct of an epoxy compound and phosphoric acid or acid phosphate.

16. The method for forming a multi-layer coating according to claim 13, wherein the amount of said phosphoric acid and/or said phosphate is 0.05–30 parts by weight on the basis of 100 parts by weight of solid resin components in said coating composition.

17. The method for forming a multi-layer coating according to claim 13, wherein said phosphate is at least one compound selected from the group consisting of:

(1) a compound represented by the following general formula:

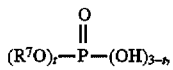

wherein $R^7$ is an alkyl group having 1–18 carbon atoms; and t is 1 or 2;

(2) a compound represented by the following general formula;

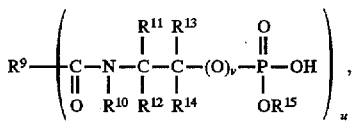

wherein $R^9$ is an alkyl group having a valence of u or an aryl group; $R^{10}$ and $R^{15}$ are a hydrogen atom, an alkyl group having 1–24 carbon atoms or an aryl group; $R^{11}$, $R^{12}$, $R^{13}$, and $R^{14}$ are a hydrogen atom, an alkyl group having 1–3 carbon atoms or an aryl group having 6–7 carbon atoms, in which said $R^9$–$R^{15}$ may be the same or different, v is 0 or 1, and u is an integer of 1–4; and (3) a compound represented by the following general formula:

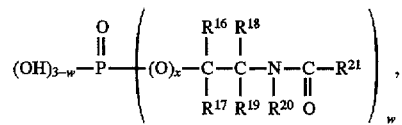

wherein $R^{16}$, $R^{17}$, $R^{18}$ and $R^{19}$ are a hydrogen atom, an alkyl group having 1–3 carbon atoms or an aryl group having 6–7 carbon atoms, and $R^{20}$ and $R^{21}$ are a hydrogen atom an alkyl group having 1–24 carbon atoms or an aryl group, in which said $R^{16}$–$R^{21}$ may be the same or different; x is 0 or 1, and w is 1 or 2.

18. The method for forming a multi-layer coating according to claim 12, wherein said phosphoric group-containing compound is at least one compound selected from the group consisting of:

(1) a resin having at least one phosphoric group and a plurality of hydrosilyl groups in a molecule, (2) a resin having at least one phosphoric group and a plurality of alkenyl groups in a molecule; and (3) a resin having at least one phosphoric group and a plurality of hydrosilyl groups and alkenyl groups in a molecule.

19. The method for forming a multi-layer coating according to claim 11, wherein a weight ratio of said hydrosilyl groups to said alkenyl groups is 0.3–4.

20. The method for forming a multi-layer coating according to claim 11, wherein said cross-linking agent (d) is an amino resin having 0–1 imino group per one triazine ring.

* * * * *